(12) United States Patent
Takahashi et al.

(10) Patent No.: US 10,853,963 B2
(45) Date of Patent: Dec. 1, 2020

(54) OBJECT DETECTION DEVICE, DEVICE CONTROL SYSTEM, AND MEDIUM

(71) Applicants: Sadao Takahashi, Kanagawa (JP); Yuji Takahashi, Kanagawa (JP); Shinichi Sumiyoshi, Kanagawa (JP); Yuu Yamada, Kanagawa (JP); Seiya Amano, Kanagawa (JP); Soichiro Yokota, Kanagawa (JP); Hiroyoshi Sekiguchi, Kanagawa (JP)

(72) Inventors: Sadao Takahashi, Kanagawa (JP); Yuji Takahashi, Kanagawa (JP); Shinichi Sumiyoshi, Kanagawa (JP); Yuu Yamada, Kanagawa (JP); Seiya Amano, Kanagawa (JP); Soichiro Yokota, Kanagawa (JP); Hiroyoshi Sekiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 156 days.

(21) Appl. No.: 16/051,882

(22) Filed: Aug. 1, 2018

(65) Prior Publication Data
US 2018/0357783 A1 Dec. 13, 2018

Related U.S. Application Data

(63) Continuation of application No. PCT/JP2016/087253, filed on Dec. 14, 2016.

(30) Foreign Application Priority Data

Feb. 5, 2016 (JP) .................................. 2016-021179

(51) Int. Cl.
*G06K 9/00* (2006.01)
*G06T 7/70* (2017.01)
(Continued)

(52) U.S. Cl.
CPC ................. *G06T 7/70* (2017.01); *B60R 21/00* (2013.01); *G01B 11/00* (2013.01); *G01C 3/06* (2013.01);
(Continued)

(58) Field of Classification Search
CPC ....................................................... G06K 9/00
(Continued)

(56) References Cited

U.S. PATENT DOCUMENTS 5,621,827 A 4/1997 Uchiyama et al.
7,787,712 B2 8/2010 Takahashi et al.
(Continued)

FOREIGN PATENT DOCUMENTS

EP 2767927 2/2014
JP 07-071936 3/1995
(Continued)

OTHER PUBLICATIONS

Japanese Office Action dated Sep. 10, 2019, in Patent Application No. 2017-565422, 3 pages.
(Continued)

*Primary Examiner* — Stephen P Coleman
(74) *Attorney, Agent, or Firm* — Oblon, McClelland, Maier & Neustadt, L.L.P.

(57) ABSTRACT

An object detection device includes a map generator configured to generate, based on a distance image that includes distance information for each coordinate, a first map in which the coordinate in a horizontal direction of the distance image is associated with the distance information, and a second map in which the coordinate in the horizontal direction of the distance image is associated with the distance information, the second map having a lower resolution than the first map; and an object detector configured to detect an object based on the first map when a distance represented
(Continued)

CAPTURED IMAGE by the distance information is within a first range, and to detect an object based on the second map when a distance represented by the distance information is within a second range.

11 Claims, 20 Drawing Sheets

(51) Int. Cl.
| | | |
|---|---|---|
| G08G 1/16 | (2006.01) | |
| G01C 3/06 | (2006.01) | |
| B60R 21/00 | (2006.01) | |
| G01B 11/00 | (2006.01) | |
| G06T 7/00 | (2017.01) | |
| G06T 7/593 | (2017.01) | |
| H04N 13/204 | (2018.01) | |

(52) U.S. Cl.
CPC ............ *G06K 9/00805* (2013.01); *G06T 7/00* (2013.01); *G06T 7/593* (2017.01); *G08G 1/16* (2013.01); *H04N 13/204* (2018.05); *G06T 2200/04* (2013.01); *G06T 2207/10021* (2013.01); *G06T 2207/10028* (2013.01); *G06T 2207/30236* (2013.01); *G06T 2207/30261* (2013.01)

(58) Field of Classification Search
USPC ......................................................... 382/103
See application file for complete search history.

(56) References Cited

U.S. PATENT DOCUMENTS

| | | |
|---|---|---|
| 7,982,141 B2 | 7/2011 | Takahashi et al. |
| 8,570,334 B2 | 10/2013 | Sekiguchi et al. |
| 8,605,153 B2 | 12/2013 | Sasaki et al. |
| 8,950,872 B2 | 2/2015 | Hasegawa et al. |
| 9,330,320 B2 | 5/2016 | Takahashi et al. |
| 9,443,294 B2 | 9/2016 | Sumiyoshi |
| 9,637,118 B2 | 5/2017 | Yokota et al. |
| 9,726,604 B2 | 8/2017 | Sekiguchi et al. |
| 9,819,927 B2 | 11/2017 | Takahashi et al. |
| 2007/0195370 A1 | 8/2007 | Suga et al. |
| 2012/0056984 A1* | 3/2012 | Zhang .................. H04N 13/128 348/43 |
| 2012/0242835 A1 | 9/2012 | Li et al. |
| 2014/0267243 A1* | 9/2014 | Venkataraman ........ G06T 7/557 345/419 |
| 2015/0035824 A1* | 2/2015 | Takahashi ............ H04N 13/271 345/419 |
| 2015/0049195 A1 | 2/2015 | Ishigaki et al. |
| 2015/0294160 A1 | 10/2015 | Takahashi et al. |
| 2015/0332103 A1 | 11/2015 | Yokota et al. |
| 2015/0341614 A1* | 11/2015 | Senoh .................. H04N 19/597 348/43 |
| 2016/0005179 A1* | 1/2016 | Petyushko ................ G06T 5/50 382/154 |
| 2016/0014406 A1 | 1/2016 | Takahashi et al. |
| 2016/0019429 A1 | 1/2016 | Ishigaki et al. |
| 2016/0275695 A1* | 9/2016 | Luczak .................. G06T 7/285 |
| 2016/0301912 A1 | 10/2016 | Saitoh et al. |

FOREIGN PATENT DOCUMENTS

| | | |
|---|---|---|
| JP | 2006-038578 | 2/2006 |
| JP | 2006-134035 | 5/2006 |
| JP | 2006-236104 A | 9/2006 |
| JP | 2013-196193 | 9/2013 |
| JP | 2013-250907 | 12/2013 |
| JP | 2014-225220 | 12/2014 |
| JP | 2015-207281 | 11/2015 |

OTHER PUBLICATIONS

Extended European Search Report dated Jan. 11, 2019 in European Patent Application No. 16889419.4, citing documents AA, and AX therein, 8 pages.

Oniga, F., et al., "Fast Obstacle Detection Using U-Disparity Maps with Stereo Vision", IEEE International Conference on Intelligent Computer Communication and Processing, XP032803401, Sep. 2015, pp. 203-207.

International Search Report dated Mar. 7, 2017 in PCT/JP2016/087253 Filed on Dec. 13, 2016 (with English translation).

Hu, Z. et al., "A Complete U-V-Disparity Study for Stereovision Based 3D Driving Environment Analysis", Kumamoto University, Japan, Fifth International Conference on 3-D Digital Imaging and Modeling, 3DIM'05, IEEE (2005), 8 pages.

* cited by examiner

CAPTURED IMAGE

U MAP (FREQUENCY)

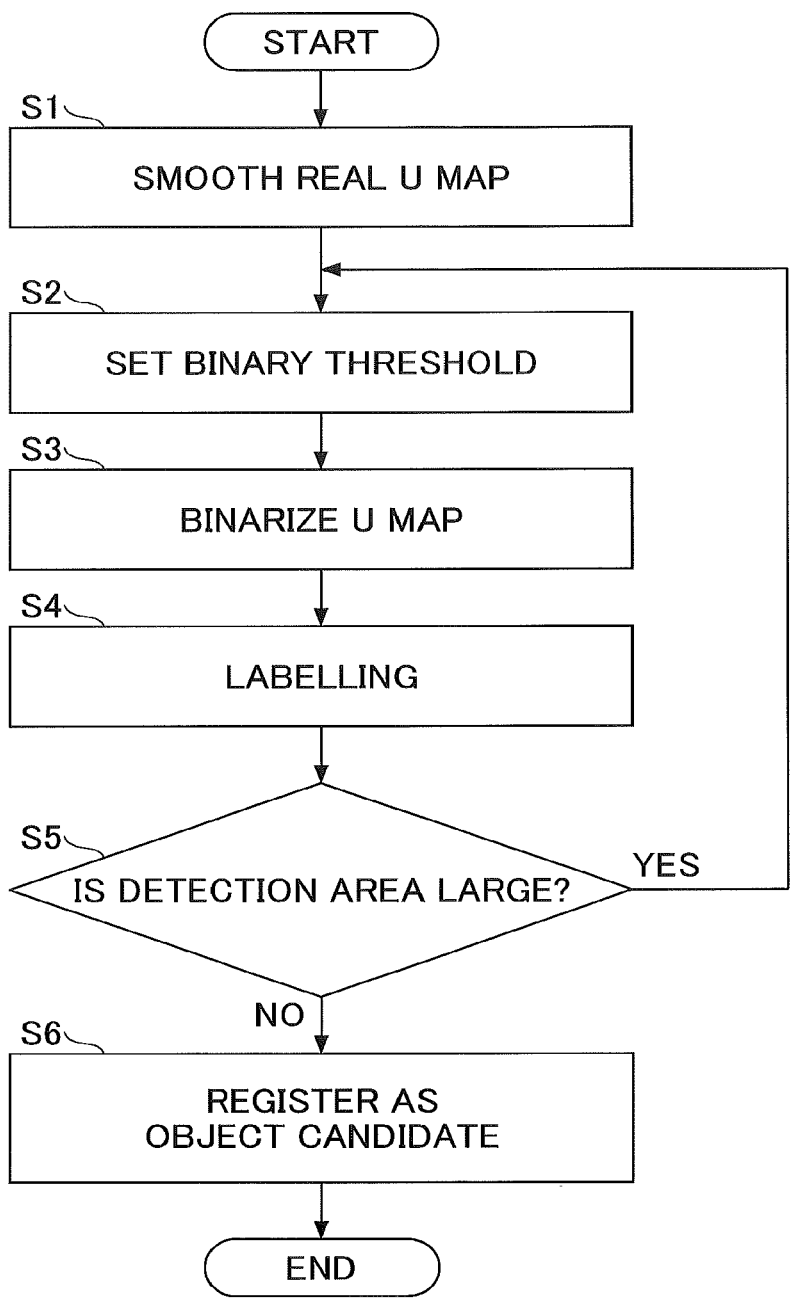

PARALLAX IMAGE

OBJECT DETECTION DEVICE, DEVICE CONTROL SYSTEM, AND MEDIUM

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2016/087253 filed on Dec. 14, 2016, which is based upon and claims the benefit of priority of Japanese Patent Application No. 2016-021179 filed on Feb. 5, 2016, the entire contents of which are incorporated herein by reference.

BACKGROUND OF THE INVENTION

1. Field of the Invention

The present disclosure relates to an object detection device, a device control system, an imaging device, an object detection method, and a medium.

2. Description of the Related Art

With respect to the safety of automobiles, development of body structures of automobiles and the like has been conducted conventionally from a viewpoint of how to protect a pedestrian or how to protect an occupant when colliding with a pedestrian or another automobile. However, development of information processing technologies and image processing technologies in recent years has enabled to develop technologies of detecting a person and an automobile at a high speed. Automobiles having such technologies applied have already been released, which are capable of applying the brakes automatically before colliding, to prevent collision. In order to apply the brakes automatically, it is necessary to precisely measure the distance to a person or another vehicle, and therefore, distance measurement by a millimeter-wave radar or a laser radar, distance measurement by a stereo camera, and the like have been put to practical use.

In order for a stereo camera to precisely detect a three-dimensional position and a size of an object such as a person and another vehicle, a method has been already known that detects an object as a mass, further detects the position of a road surface, and detects the object that contacts the road surface.

As for the stereo camera as described above, for example, Patent document 1 discloses a technology that includes a parallax image generator to generate a parallax image from a captured image of a stereo camera; a road surface shape detector to detect a road surface in the captured image; a real U-map generator to generate, based on the detected road surface and the parallax image, map information representing a frequency distribution of parallax values where the horizontal axis represents the distance in the horizontal direction and the vertical axis represents the distance in the movement direction, and a height distribution; an object candidate area detector to detect an object candidate area based on the frequency distribution; and an object area extractor to extract a three-dimensional object on the road surface based on the object candidate area.

However, in a conventional technology as described in, for example, Patent document 1, since information obtained from a captured image is less for a distant object in the captured image in a process of detecting the object as a mass, there is a problem that the detection tends to be unstable.

PATENT LITERATURE

Patent document 1: Japanese Laid-Open Patent Publication No. 2015-207281

SUMMARY OF THE INVENTION

According to an embodiment, an object detection device includes a map generator configured to generate, based on a distance image that includes distance information for each coordinate, a first map in which the coordinate in a horizontal direction of the distance image is associated with the distance information, and a second map in which the coordinate in the horizontal direction of the distance image is associated with the distance information, the second map having a lower resolution than the first map; and an object detector configured to detect an object based on the first map when a distance represented by the distance information is within a first range, and to detect an object based on the second map when a distance represented by the distance information is within a second range.

BRIEF DESCRIPTION OF THE DRAWINGS

FIG. 7 is a flowchart illustrating steps of an object detection process in an embodiment in the present disclosure;

DETAILED DESCRIPTION OF THE PREFERRED EMBODIMENTS

Figure 1:
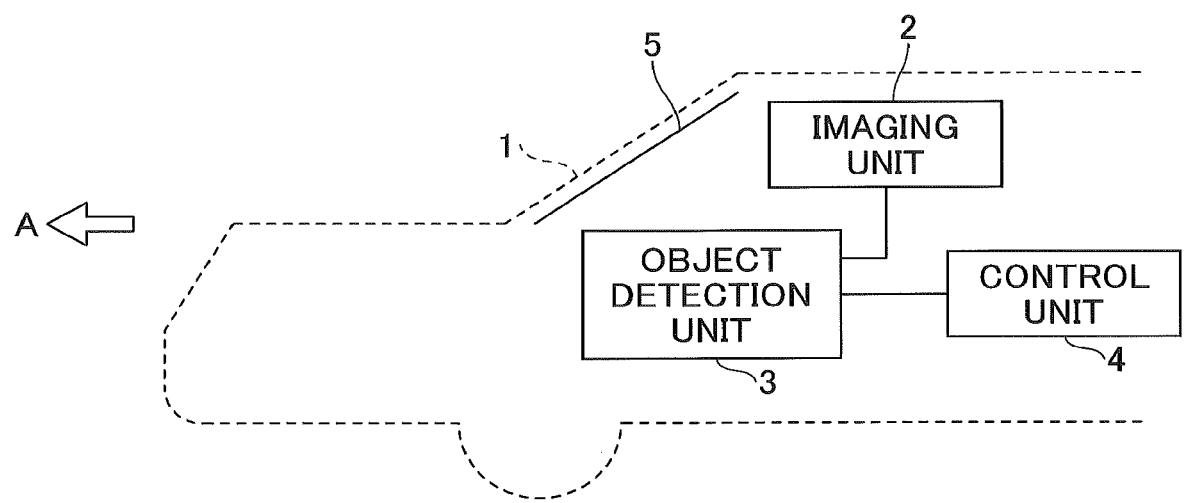
FIG. 1 is a schematic configuration diagram of a device control system in an embodiment in the present disclosure.

In the following, an object detection device in an embodiment in the present disclosure will be described by using the drawings; unless exceeding the subject matters in the present disclosure, the present invention is not limited to the embodiment in any way. Note that the same or corresponding parts are given the same reference codes throughout the drawings, and duplicated description may be simplified or omitted properly. Also, embodiments described below are best mode forms in the present disclosure, and do not limit the claims according to the present invention.

According to an embodiment, it is possible to stably detect a distant object.

In the embodiments, an example will be used for describing an object detection device that is attached to a vehicle as a moving object, to detect an object such as another vehicle traveling ahead of the vehicle that is captured as an image by an imaging device such as a stereo camera. Meanwhile, the moving object is not limited to a vehicle, and the example can be applied to a vessel, an airplane, and the like.

Furthermore, operations and the like of the vehicle are controlled, for example, by using a result detected by the object detection device. Note that the control here includes a concept of controlling the vehicle itself, and in addition, concepts of controlling predetermined devices installed in the vehicle, for example, a brake system, a steering system, and an engine control system, and the like.

Also, the object detection device may be configured, for example, as a stand-alone information processing apparatus or the like, or may be configured to have processing functions of the object detection device embedded in a processing board included in an imaging device such as a stereo camera.

<Device Control System in Embodiment>

A device control system in the embodiment will be described with reference to FIG. 1. Here, the outline will be described for a system that controls a vehicle as a device, which is taken as an example. Assume that a vehicle 1 has its front nose in the direction designated by an arrow A. The vehicle 1 is equipped with an imaging unit 2, an object detection unit 3, and a control unit 4. The imaging unit 2 is installed, for example, around a rearview mirror in the vehicle to capture another vehicle traveling ahead of the vehicle 1 through a windshield 5.

Based on an image captured by the imaging unit 2, the object detection unit 3 detects an object, and by using the detection result, causes the control unit 4 to control the traveling speed of the vehicle, the distance from another vehicle, the traveling lane, a timing of applying the brake, and the like. Note that the terms of "imaging unit", "object detection unit", and "control unit" are adopted to distinguish contents of description here from contents of description elsewhere for the sake of convenience, and terming these as "units" has no specific intention. In other words, the imaging unit, the object detection unit, and the control unit may be referred to as the imaging device or the imaging means, the object detection device or the object detector, and the control device or the controller, respectively.

<Imaging Device in Embodiment>

Figure 2:
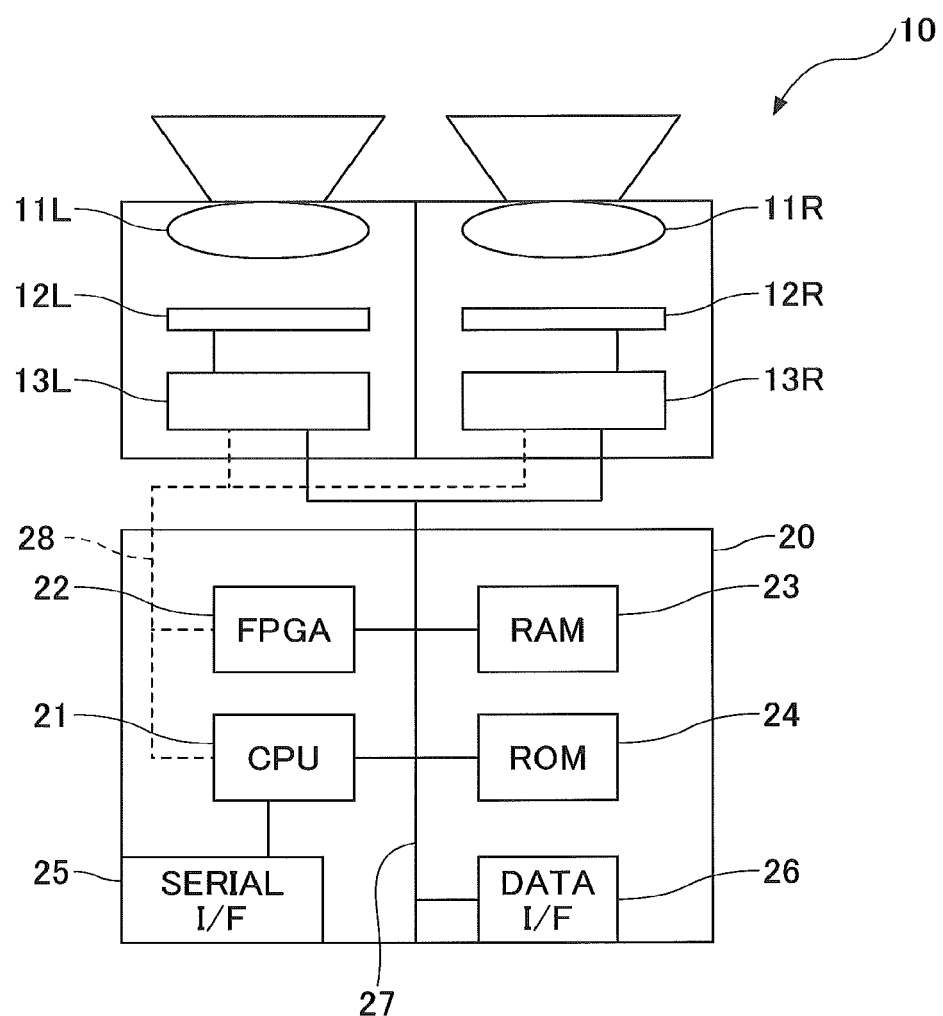
FIG. 2 is a schematic configuration diagram of an imaging device in an embodiment in the present disclosure.

The imaging device in the embodiment will be described with reference to FIG. 2. The imaging device in the embodiment is constituted with a stereo camera 10 and an image processing board 20.

The stereo camera 10 is constituted with two cameras attached in parallel. The stereo camera 10 is equipped with an image sensor 12L and an image sensor controller 13L, an image sensor 12R and an image sensor controller 13R, corresponding to a left lens 11L and a right lens 11R, respectively. Note that in the embodiment, although the stereo camera 10 is constituted with two cameras, the present invention does not exclude a configuration of three or more cameras.

The image sensor controllers 13L and 13R play a role of exposure control of the image sensors 12L and 12R, A/D conversion, control of image reading, communication with an external circuit, and transmission of image data. The stereo camera 10 is connected with the image processing board 20 by a data bus 27 and a serial bus 28. From the stereo camera 10, brightness image data and parallax image data are output.

Brightness image data output from the stereo camera 10 is transmitted to the image processing board 20 from the image sensors 12L and 12R through the data bus 27. Also, the serial bus 28 changes a sensor exposure control value from the image processing board 20, changes image reading parameters, and transmits and receives a variety of setting data.

The image processing board 20 is equipped with a CPU 21, an FPGA 22, a RAM 23, a ROM 24, a serial I/F 25, a data I/F 26, the data bus 27, and the serial bus 28.

The CPU 21 executes controlling the entire image processing board 20, image processing, and image recognition processing. The FPGA 22 applies a process to image data saved in the RAM 23 that needs to be done in real time. The FPGA 22 generates a parallax image by executing, for example, a gamma correction, a distortion correction, namely, making right and left images parallel, and parallax calculation by block matching, and writes it back into the RAM 23.

The CPU 21 controls the image sensor controller 13L and 13R of the stereo camera 10, and controls the image processing board 20 as a whole. Also, the CPU 21 loads a program to execute road surface shape detection, guardrail detection, and object detection from the ROM 24, and executes various processes that take as input a brightness image and a parallax image stored in the RAM 23. Furthermore, the CPU 21 outputs detected data to the outside from the serial I/F 25 or the data I/F 26.

When executing a process, by using the data I/F 26, the CPU 21 takes, as input, information on the vehicle, such as the vehicle speed, acceleration, steering angle, and yaw rate, to use as parameters of various processes such as road surface shape detection. Data output to the outside is used as input data for executing control of the vehicle such as an automatic emergency braking and automatic speed controlling. Note that a part of the functions implemented by the CPU 21 and the FPGA 22 may be implemented outside of the image processing board 20.

<Functional Blocks of Object Detection Device in Embodiment>

Figure 3A:
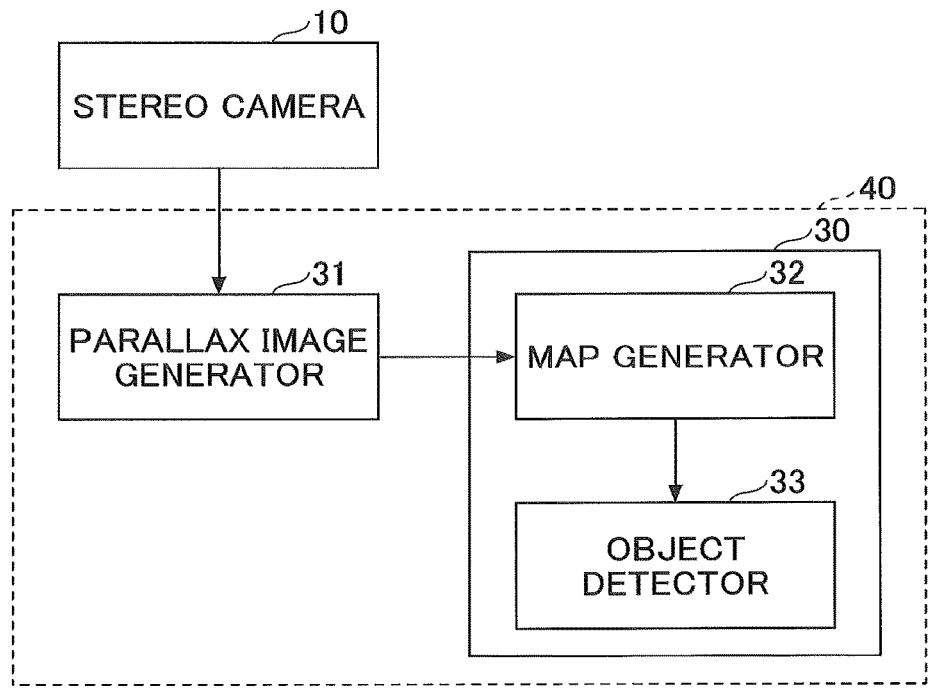
FIG. 3A is a functional block diagram of an object detection device in an embodiment in the present disclosure.
Figure 3B:
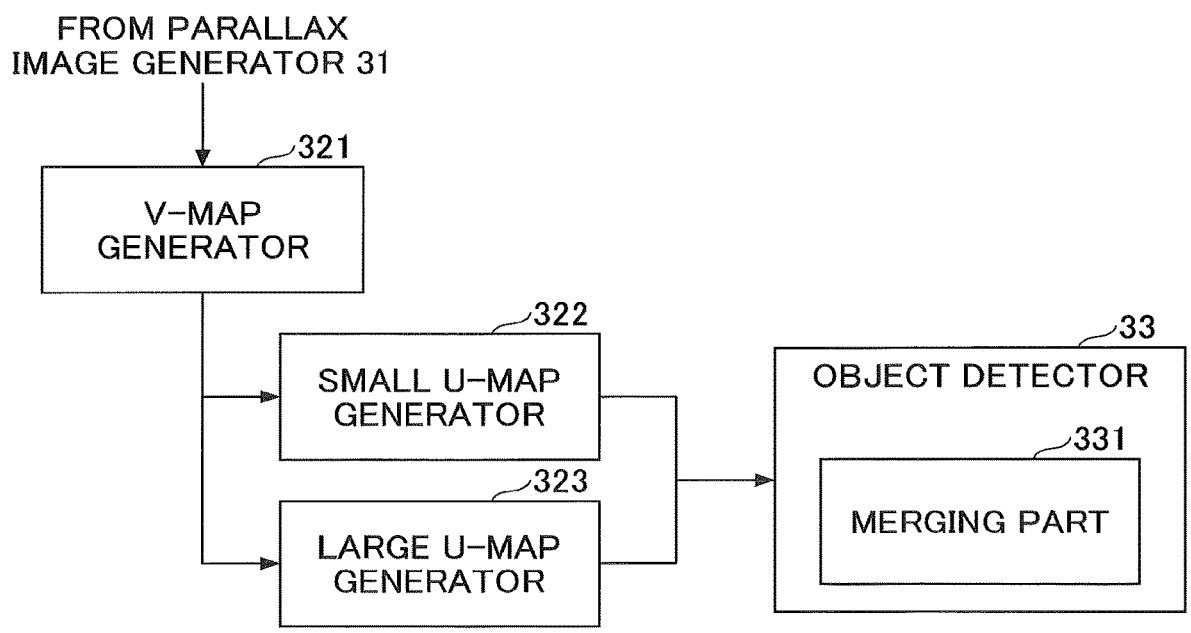
FIG. 3B is a functional block diagram of an object detection device in an embodiment in the present disclosure.

Functional blocks of the object detection device in the embodiment will be described with reference to FIGS. 3A-B. The image processing device 40 in the embodiment is configured to include a parallax image generator 31 and an object detection device 30 as illustrated in FIG. 3A. The object detection device 30 is configured to include a map generator 32 and an object detector 33 as illustrated in FIG. 3A.

The parallax image generator 31 is a parallax image generation means of generating a parallax image from a captured image captured by the stereo camera 10 consisting of two cameras as two imaging means. Functions of the parallax image generator 31 are implemented by the FPGA 22 illustrated in FIG. 2.

More specifically, the parallax image generator 31 calculates a parallax value corresponding to an image part between captured images captured by the stereo camera 10, in order to obtain a parallax image from brightness image data obtained by the stereo camera 10.

The parallax value here is obtained by taking one of the images captured by the stereo camera 10 as a reference image, and taking the other image as a comparison image, and calculating the amount of positional shift between the image part on the reference image and the image part on the comparison image at the same point in an imaging area. Then, by using principles of triangulation, it is possible to calculate from this parallax value the distance to the same point in the imaging area corresponding to the image part. Since the parallax value can be treated equivalent to the distance value (distance information), a parallax image will be described as an example of a distance image in the embodiment.

Although brightness image data is output as a captured image from the stereo camera 10, in the case where the stereo camera 10 is colored, a color brightness conversion is executed to obtain a brightness signal (Y) from RGB signals. For example, a brightness signal is obtained by the following Expression [1].

$$Y = 0.3R + 0.59G + 0.11B \quad [1]$$

Note that the object detection device 30 applies a paralleled image generation process to brightness image data obtained from the stereo camera 10. This paralleled image generation process is a process of converting stereo images output from respective cameras into ideal paralleled stereo images that would be obtained when the two cameras are attached in parallel, from distortion in optical systems in the two cameras constituting the stereo camera 10 and from the relative positional relationship between the right and left cameras.

After having executed the paralleled image generation processing in this way, the parallax image generator 31 executes a parallax image generation process of generating parallax image data. In the parallax image generation process, first, brightness image data obtained from one of the two cameras is taken as reference image data, and brightness image data obtained from the other camera is taken as comparison image data, and these data items are used to calculate the parallax between the two, so as to generate and output parallax image data. This parallax image data represents a parallax image in which a pixel value corresponding to the parallax value d calculated for each image part on the reference image data is represented as the pixel value of the image part.

Specifically, the parallax image generator 31 defines, on a certain line in the reference image data, a block that consists of multiple pixels, for example, 16 pixels by 1 pixel, around one pixel of interest. Meanwhile, the parallax image generator 31 defines, on the same line in the comparison image data, a block having the same size as the block defined in the reference image data; shifts the block one pixel by one pixel in the horizontal line direction; and calculates a correlation value that represents a correlation between a feature quantity that represents a feature of a pixel value in the block defined in the reference image data, and a feature quantity that represents a feature of a pixel value in each of the shifted blocks in the comparison image data.

Then, based on the calculated correlation values, the parallax image generator 31 executes a matching process that selects a block in the comparison image data that has a highest correlation with the block in the reference image data among the blocks in the comparison image data. Then, the parallax image generator 31 calculates the amount of the positional shift between the pixel of interest of the block in the reference image data, and a correspondence pixel of the block of the comparison image data selected by the matching process as the parallax value d. By executing a process of calculating such a parallax value d for the entire area or a specific area of the reference image data, it is possible to obtain parallax image data.

As the feature quantity of a block used for a matching process, it is possible to use, for example, a brightness value that is a value of each pixel in the block, and as the correlation value, for example, it is possible to use the sum total of the absolute values of differences between brightness values that are values of pixels in the block in the reference image data, and brightness values that are values of corresponding pixels in the block in the comparison image data. In this case, a block having the minimum sum total can be considered as having the highest correlation.

In the case of implementing a matching process in the parallax image generator 31 by a hardware process, it is possible to use methods including, for example, SSD (Sum of Squared Difference), ZSSD (Zero-mean Sum of Squared Difference), SAD (Sum of Absolute Difference), and ZSAD (Zero-mean Sum of Absolute Difference).

Note that in a matching process, since a parallax value can be calculated by only units of pixels, in the case where a parallax value is required at a subpixel level finer than one pixel, it is necessary to use an estimated value. As the estimation method, it is possible to use, for example, a conformal line method, a quadratic curve method, and the like. However, since an error is generated in such a subpixel-level estimated parallax value, EEC (estimated error correction) or the like may be used to reduce the estimated error.

The map generator 32 is a map generator to generate two types of maps having different resolutions, based on a parallax image generated by the parallax image generator 31. The functions of the map generator 32 are implemented by the CPU 21 illustrated in FIG. 2.

In more detail, the map generator 32 generates a first map, and generates a second map in which pixels in the horizontal direction are thinned out with respect to the first map. More specifically, the map generator 32 is constituted with a V-map generator 321, a small U-map generator 322, and a large U-map generator 323 as illustrated in FIG. 3B. The above "first map" corresponds to a large U map, and the "second map" corresponds to a small U map. Also, the object detector 33 includes a merging part 331.

In the embodiment, a large U map is a U map having a comparatively high resolution, and a small U map is a U map having a lower resolution in which every other pixel in the horizontal direction or the width direction is thinned out with respect to the large U map. Note that although every other pixel in the horizontal direction is thinned out here, this is merely an example.

A V-map generation process by the V-map generator 321 will be described with reference to FIGS. 4A-B. The V-map generator 321 generates a V map based on a parallax image generated by the parallax image generator 31. Generation of a V map is executed to estimate a road surface position in a parallax image, so as to recognize an object that exists on the road surface. Identifying the road surface position enables to obtain height information from the road surface, and to identify the size of an object that exists on the road surface.

Each parallax image data item included in parallax image data is represented by a set (x, y, d) each representing an x-direction position, a y-direction position, and a parallax value d. Among these sets of values (x, y, d), the V-map generator 321 generates a two-dimensional histogram by setting d in the X-axis, y in the Y-axis, and the frequency in the Z-axis. This two-dimensional histogram corresponds to a V map. In other words, for each pixel in a parallax image, the V-map generator 321 counts up the frequency by one when a pixel having (d, y) is found in the parallax image.

Figure 4A:
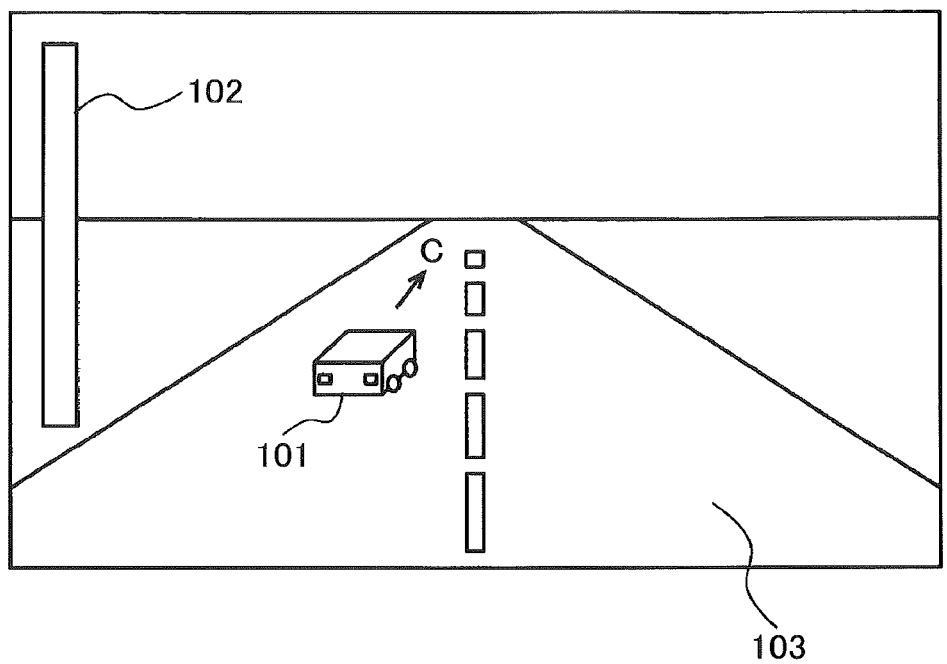
FIG. 4A is a schematic view illustrating a V-map generation process in an embodiment in the present disclosure.
Figure 4B:
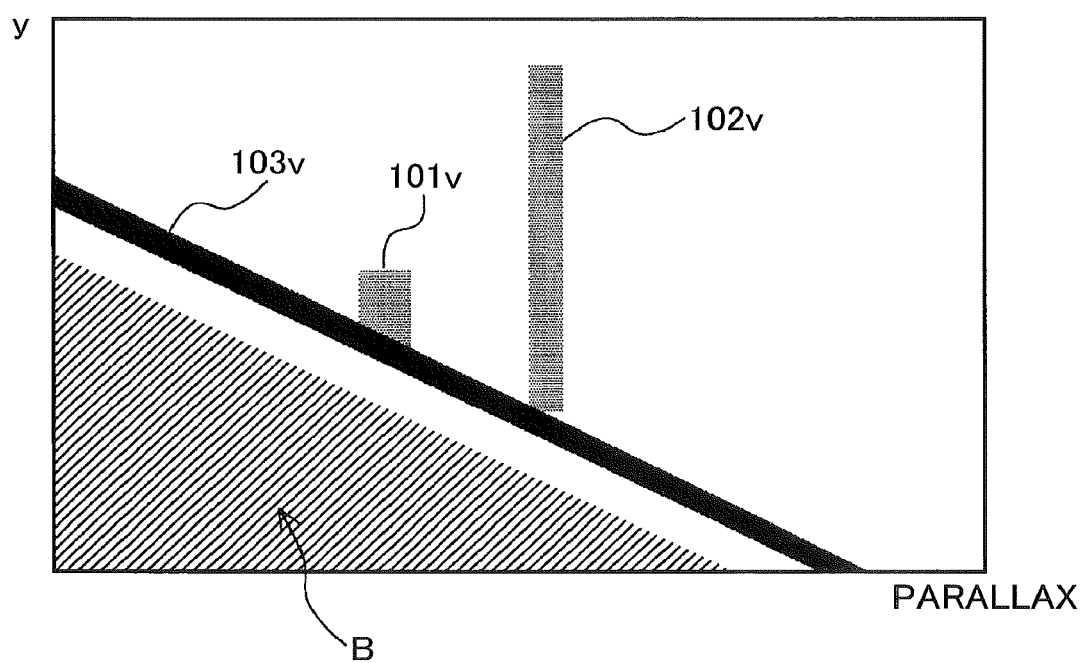
FIG. 4B is a schematic view illustrating a V-map generation process in an embodiment in the present disclosure.

FIG. 4A is a captured image that captures a scene in which a vehicle 101 is traveling on a road surface 103 in a direction designated by an arrow C, and a utility pole 102 exists on the left side of the road surface 103. A V map generated from this image by the V-map generator 321 is FIG. 4B. As illustrated in FIG. 4B, when converting into a V map from a parallax image, clustering parallax values at a certain height from the road surface to be associated on the V map enables to recognize an object on a road surface. Such clustering enables to recognize a vehicle 101v, a utility pole 102v, and a road surface 103v on the V map.

Also, it is necessary to set an area in which parallax values are associated on a V map (referred to as a "polling area"). An area B illustrated in slant lines in FIG. 4B in the embodiment represents a part below the road surface 103. Since no parallax is detected in a part below the road surface 103, no parallax value is associated in the area B. In addition, it is desirable to determine a polling area considering that the estimated range of a road surface changes depending on a traveling state of a vehicle having a camera installed.

Also, the V-map generator 321 executes a road surface shape detection process that detects a shape of the road surface 103. This is a process of linearly approximating the position estimated as a road surface on the V map. As the method of linear approximation, for example, the least-squares method or the Hough transformation may be used. For example, in the case where the road surface is flat, it is possible to approximate by a single straight line, but in the case where the slope changes on the way, it is necessary to partition the map into sections to obtain precise approximation piecewise linearly.

Note that in the case of executing a road surface shape detection process on the V map, the polling area may be restricted as described above, or the area may be divided into two areas that are an area having greater parallaxes, and an area having smaller parallaxes to execute the road surface shape detection process.

The V-map generator 321 executes a road surface height table calculation process that calculates and tabulates the height of the road surface 103. A linear equation representing the road surface is obtained from the V map, and once the parallax d has been determined, the y coordinate in that case is determined. This y coordinate represents the height of the road surface, and is tabulated in a necessary range of parallaxes.

Figure 6A:
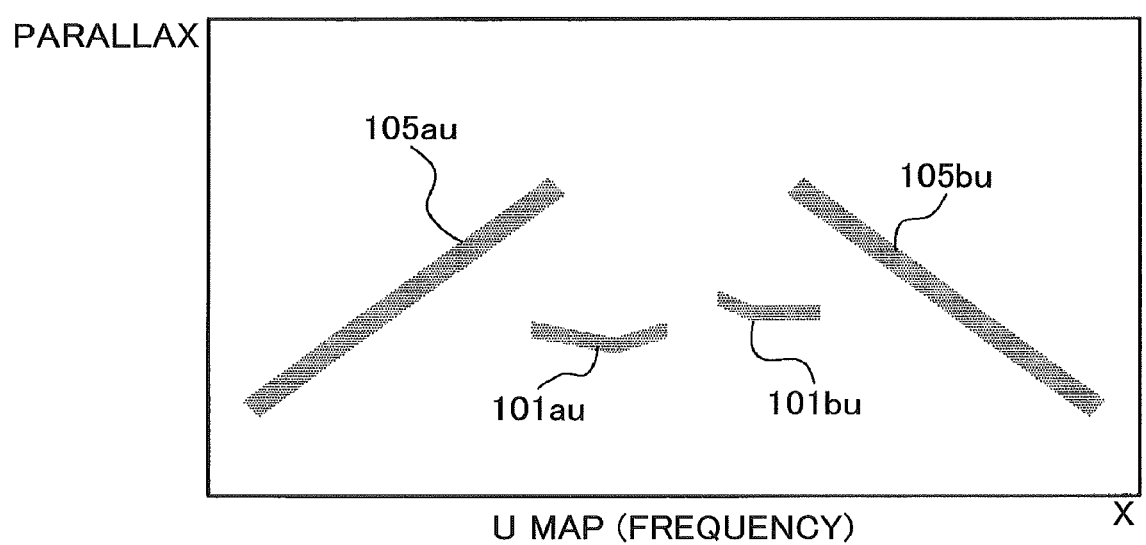
FIG. 6A is a schematic view illustrating a real U-map generation process in an embodiment in the present disclosure.

As a prerequisite for describing a small U-map generation process by the small U-map generator 322, and a large U-map generation process by the large U-map generator 323, an outline of a U-map generation process will be described with reference to FIGS. 6A-B. Note that in the following, a conceptual processor that includes the small U-map generator 322 and the large U-map generator 323 will be described as a U-map generator for the sake of convenience. Note that in the embodiment, dividing blocks as the small U-map generator 322 and the large U-map generator 323 is to make the embodiment easier to understand, and a configuration is possible in which the U-map generator generates a small U map and a large U map.

The U-map generator generates a U map in order to estimate the presence of, for example, a guardrail, a roadside wall, or the like along the road surface. The U-map generator generates two-dimensional histogram information on the X-Y with sets of values (x, y, d) each representing an x-direction position, a y-direction position, and a parallax value d for each parallax pixel data item included in parallax image data, by setting x in the X-axis, d in the Y-axis, and the frequency in the Z-axis. This two-dimensional histogram information is a U map.

In the embodiment, based on the height of each road surface part tabulated in the road surface height table described above, the U-map generator generates a frequency U map for points (x, y, d) of a parallax image located within a predetermined height range from the road surface (e.g., from 20 cm to 3 m).

Figure 5A:
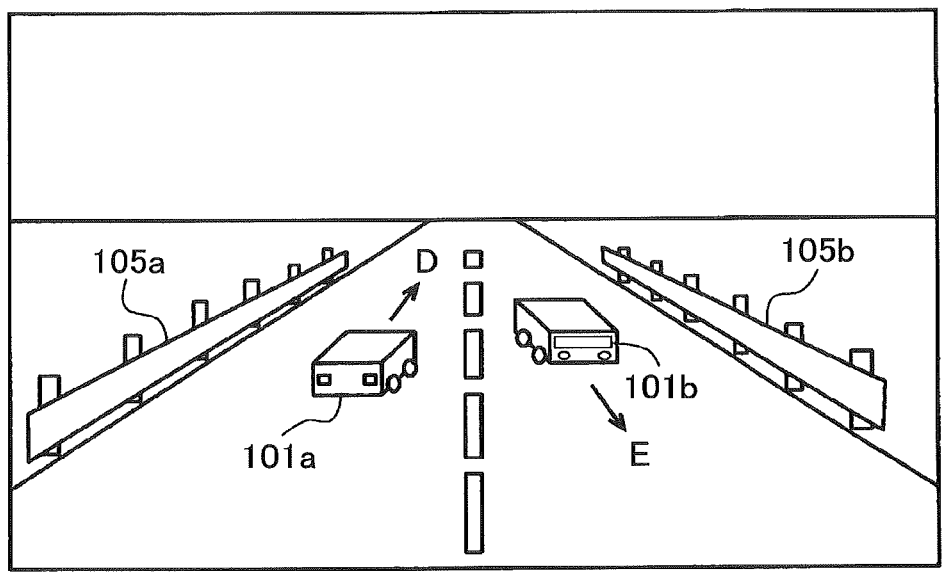
FIG. 5A is a schematic view illustrating a U-map generation process in an embodiment in the present disclosure.

FIG. 5A is a captured image that captures a state in which a vehicle 101a is traveling on the left lane in a direction designated by an arrow D on a road having one lane in each way, and a vehicle 101b is traveling on the right lane in a direction designated by an arrow E. Also, the guardrails 105a and 105b are installed on both sides of the road.

Figure 5B:
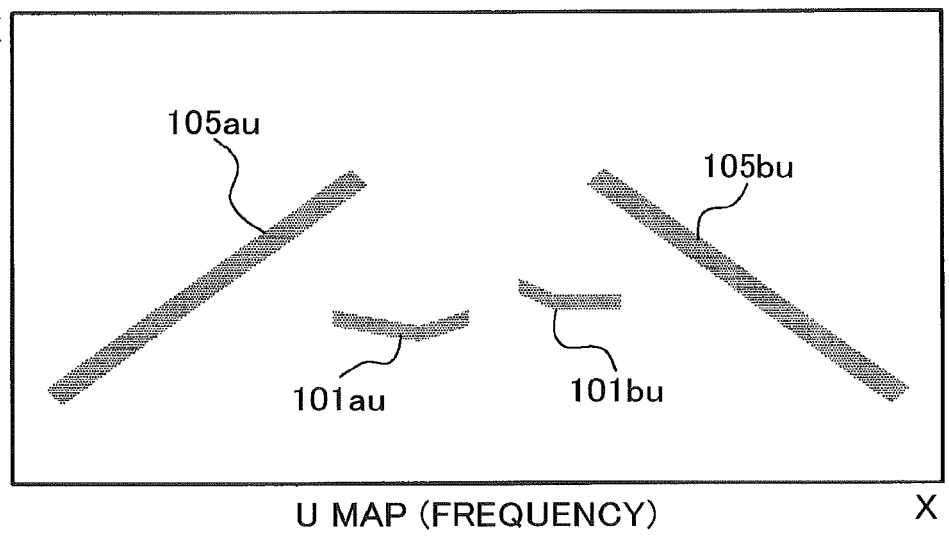
FIG. 5B is a schematic view illustrating a U-map generation process in an embodiment in the present disclosure.

FIG. 5B is a diagram illustrating a frequency U map converted from the captured image illustrated in FIG. 5A. The guardrails 105a and 105b are on straight lines extended from the right and left ends toward the top center, respectively. Here, the guardrails 105a and 105b after the U map conversion are referred to as 105au and 105bu.

Meanwhile, the vehicle 101a and the vehicle 101b appear between the guardrails 105au and 105bu, and have a shape of a horizontal line segment connected with a slanting line in the case where a side surface of the vehicle is visible and the parallax is detected. Here, the vehicle 101*a* and the vehicle 101*b* after the U map conversion are referred to as 101*au* and 101*bu*.

Figure 5C:
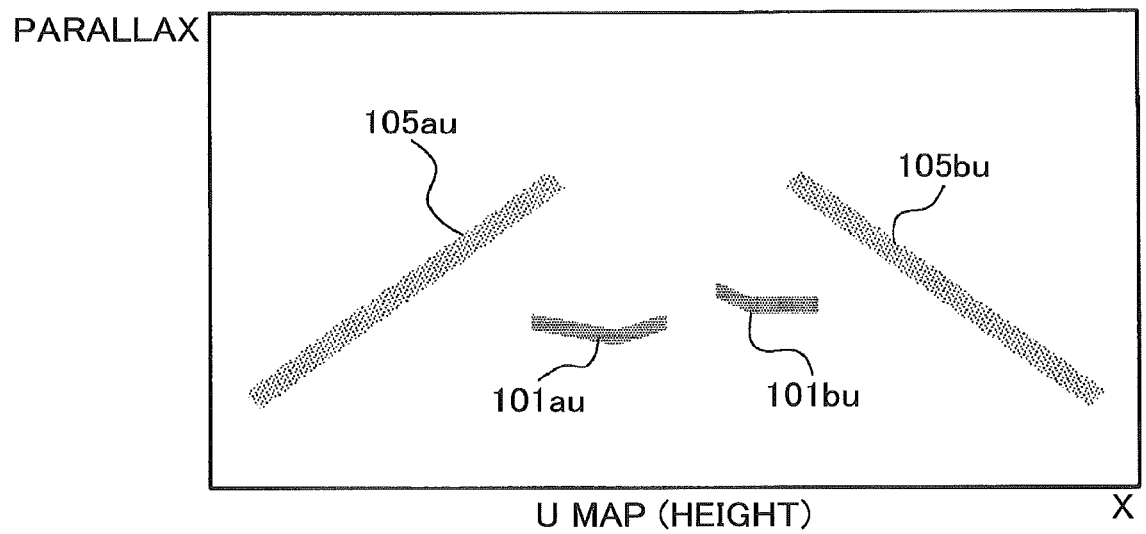
FIG. 5C is a schematic view illustrating a U-map generation process in an embodiment in the present disclosure.

FIG. 5C is a diagram representing a height U map. The U-map generator generates a height U map simultaneously with generation of a frequency U map. The U-map generator generates two-dimensional histogram information on the X-Y with sets of values (x, y, d) each representing an x-direction position, a y-direction position, and a parallax value d for each parallax pixel data item included in parallax image data, by setting x in the X-axis, d in the Y-axis, and the height from the road surface in the Z-axis. This two-dimensional histogram information is a height U map. The value of the height at this time is the highest height from the road surface.

As illustrated by the shade of hatching in FIG. 5C, the hatching of the vehicles 101*au* and 101*bu* is darker than that of the guardrails 105*au* and 105*bu*, which implies that the height of the vehicles 101*au* and 101*bu* is higher than the height of the guardrails 105*au* and 105*bu*. This enables to use the height information of the objects for object detection.

The U-map generator generates a real U map after having generated the U map. A real U-map generation process will be described with reference to FIGS. 6A-B. A real U map is a map obtained by converting the horizontal axis of a U map described above from the units of pixels of an image into an actual distance unit, and by converting the parallax value in the vertical axis into a thinned-out parallax to which a thinning-out rate depending on the distance is applied. Note that FIG. 6A is the same diagram as FIG. 5B. Although the example illustrated here has the horizontal axis converted into the real distance, it is simply necessary to be converted into a unit corresponding to the real distance.

The thinned-out parallax in the vertical axis is set such that no thinning out is applied to a longer distance (here, 50 m or longer), and thinning out to a half is applied to an intermediate distance (20 m or longer and less than 50 m), thinning out to one third is applied to a shorter distance (10 m or longer and less than 20 m), and thinning out to one eighth is applied to a very close distance (less than 10 m).

In other words, lesser thinning-out is applied to a farther place. This is because an object at a distant place is imaged smaller with less parallax information and a lower resolution of the distance, and hence, thinning-out is applied less, whereas an object at a close distant place is imaged larger with more parallax information and a higher resolution of the distance, and hence, thinning-out is applied more.

Figure 6B:
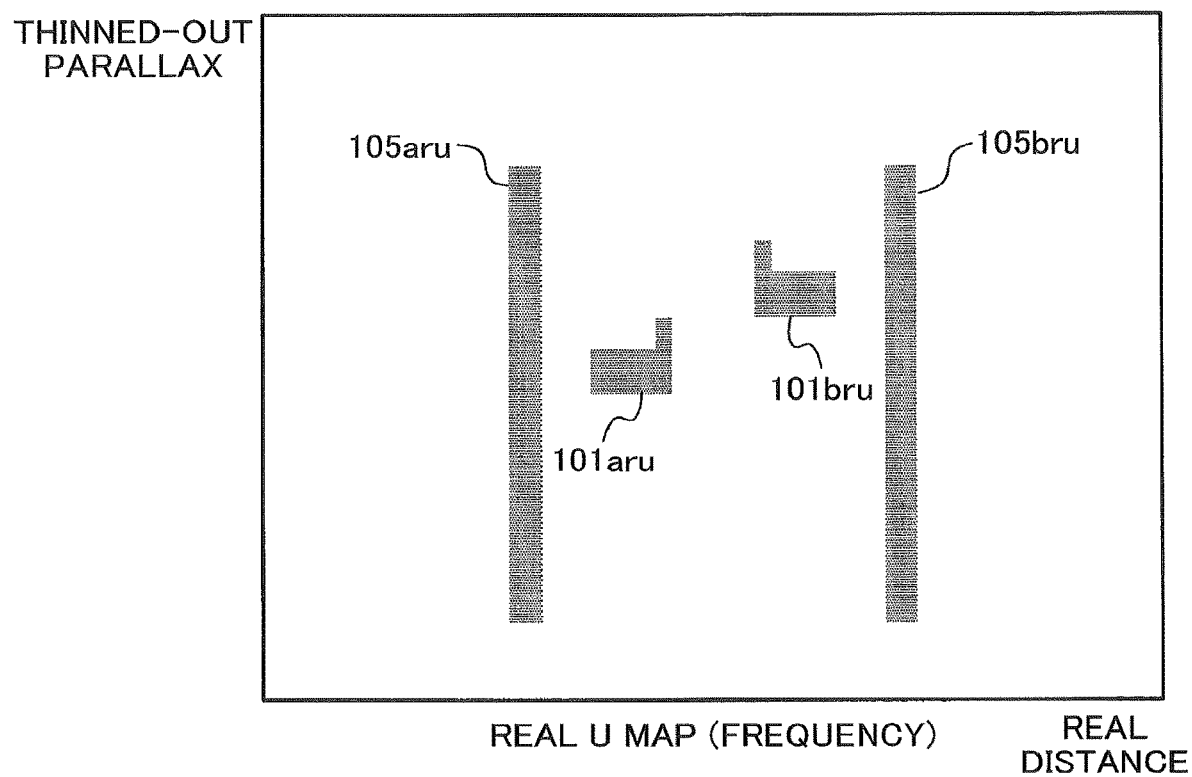
FIG. 6B is a schematic view illustrating a real U-map generation process in an embodiment in the present disclosure.

FIG. 6B is an example of a real U map generated by the U-map generator. This figure exhibits a state as if the vehicles and the like traveling on the road and the road surface are looked down from above. The guardrails 105*au* and 105*bu* are represented by vertical lines, and the guardrails 105*au* and 105*bu* after the conversion are referred to as 105*aru* and 105*bru*. Also, the shapes of the vehicles 101*au* and 101*bu* are converted into shapes closer to the real shapes. The vehicles 101*au* and 101*bu* after the conversion are referred to as 101*aru* and 101*bru*.

Note that not only a frequency map but also a height real U map can be generated for a real U map as in FIG. 5C.

In the embodiment, following the way to execute the generation process of a U map described above, a small U-map generation process by the small U-map generator 322 and a large U-map generation process by the large U-map generator 323 are executed.

Note that although a large U map generated by the large U-map generator 323 has been described as a map having a comparatively high resolution, this merely expresses a comparison with a small U map, and it may be a normal U map generated by the U-map generator described above. Note that a U map having a resolution beyond a reference value may be generated intentionally as a large U map. A small U-map generation process by the small U-map generator 322, which is one of the characterizing parts in the embodiment will be described later.

The object detector 33 is an object detector that detects an object based on two types of maps generated by the map generator. In other words, the object detector 33 detects an object based on a small U map generated by the small U-map generator 322 and a large U map generated by the large U-map generator 323.

An object detection process by the object detector 33 will be described with reference to FIG. 7. Here, an object detection using a real U map described above will be described. First, the object detector 33 smooths a real U map (Step S1). This is to make it easier to detect an area where an object is estimated to exist (referred to as an "isolated area") by smoothing the frequency. Note that a target to be determined as an object through the process in the isolated area will be referred to as an "object".

Next, the object detector 33 sets a threshold of binarization (Step S2). At first, the object detector 33 uses a small value (0) to binarize the real U map (Step S3). Then, the object detector 33 executes labeling of coordinates having a value, to detect an isolated area (Step S4).

The object detector 33 determines the size of each of multiple detected isolated areas (Step S5). This determines whether the width of a detected isolated area is within the range of the size in the case where the detected target is of the type among the pedestrian to the large-sized automobile.

If the size of the detected isolated area is great (YES at Step S5), the object detector 33 increments the binarizing threshold only by one (Step S2), to binarize only this object on the real U map (Step S3). Then, the object detector 33 executes labeling (Step S4), detects a smaller isolated area, and determines the size (Step S5). The object detector 33 repeatedly executes the above binarizing threshold setting process (Step S2) to the labeling process (Step S4), to detect isolated areas having desired sizes.

Here, the binarizing process and the labeling process will be described further in detail. The object detector 33 detects an isolated area whose frequency is higher than the surroundings on a real U map (referred to as an "island"). To detect an island, the real U map is binarized first. At first, the object detector 33 executes binarization with the threshold 0. This is because an island may be isolated, or may be connected with another island due to the height and shape of an object, partitioning of the road surface parallax, and the like, and a countermeasure is required for such cases. In other words, by binarizing the real frequency U map starting from a small threshold, it becomes possible to detect an isolated island having a suitable size at first, and then, by increasing the threshold, a connected island can be divided, to detect an isolated island having a suitable size.

As a method of detecting a binarized island, the object detector 33 uses labeling. If labeled coordinates exist around coordinates that represent the position of a pixel of interest in black, the labeling assigns the same label as the label of the pixel. If multiple labels exist, the labeling assigns a label having the smallest value and replaces the label of coordinates having other labels with the label. The width of this island can be considered as a width W close to the real object. An area having this width W within a predetermined range is regarded as an object candidate area. In other words, labeling is executed for coordinates in black after binarization, namely, coordinates whose frequency value is higher than the binarizing threshold are labeled based on the connectivity, and an area having the same label is regarded as an island.

In the size determination, in the case where the size of a detected isolated area is not great (NO at Step S5), the object detector 33 registers the detected isolated area as an object candidate (Step S6).

Next, a process of detecting a correspondence area of a parallax image, and an object area extraction process will be described with reference to FIGS. 8A-9. An island can be detected by using a real U map as described above. In this case, the width of a rectangle surrounding an island corresponds to the width of the detected object, and the height corresponds to the depth of the detected object. Also, the height of the object is the maximum of the height map of the real U map.

Figure 8A:
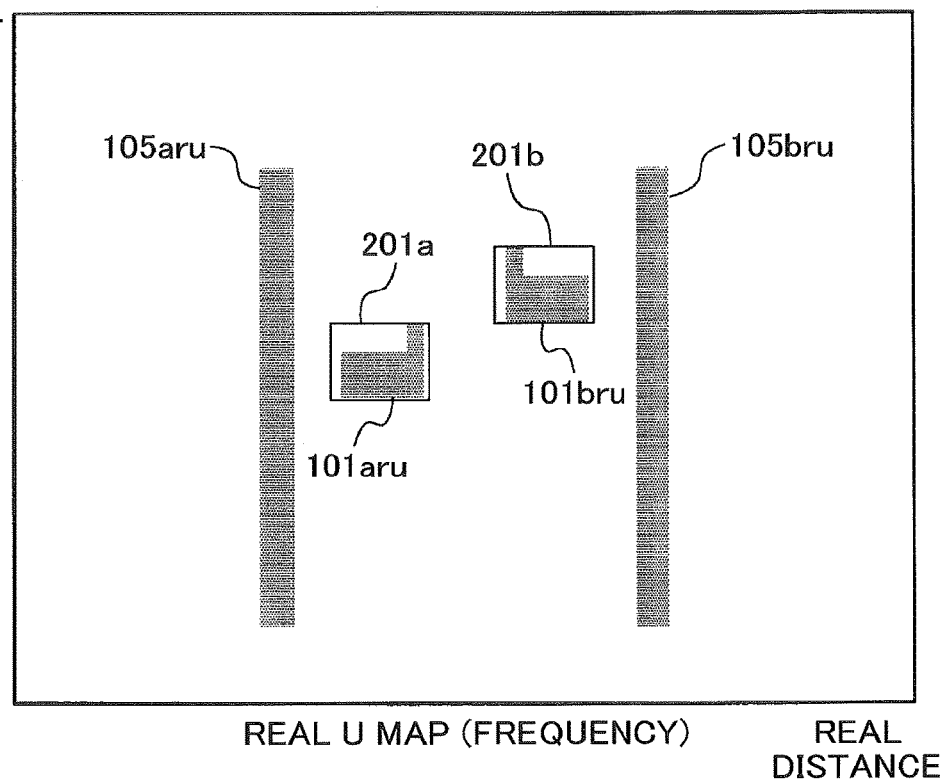
FIG. 8A is a schematic view illustrating a process of detecting a parallax image area corresponding to an area detected on a real U map in an embodiment in the present disclosure.
Figure 8B:
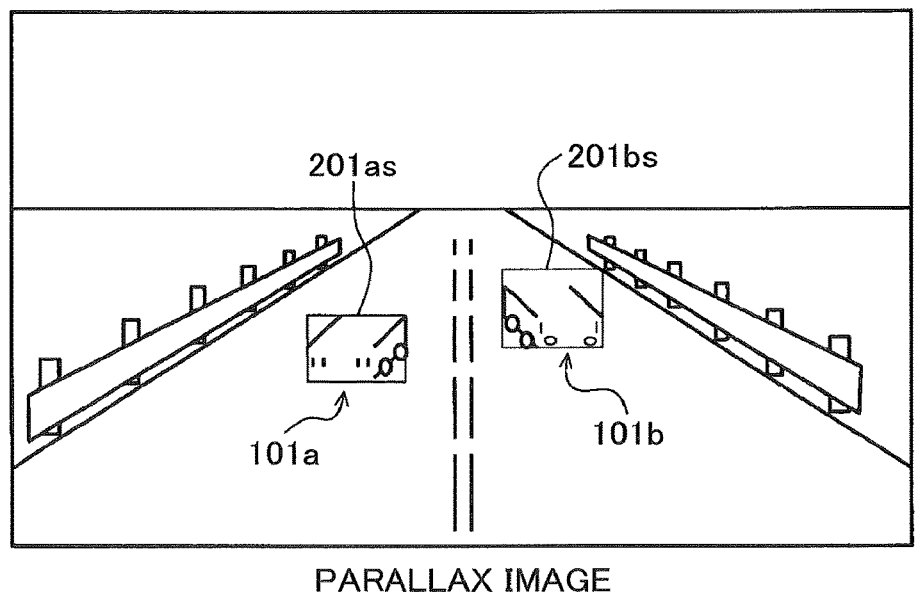
FIG. 8B is a schematic view illustrating a process of detecting a parallax image area corresponding to an area detected on a real U map in an embodiment in the present disclosure.
Figure 9:
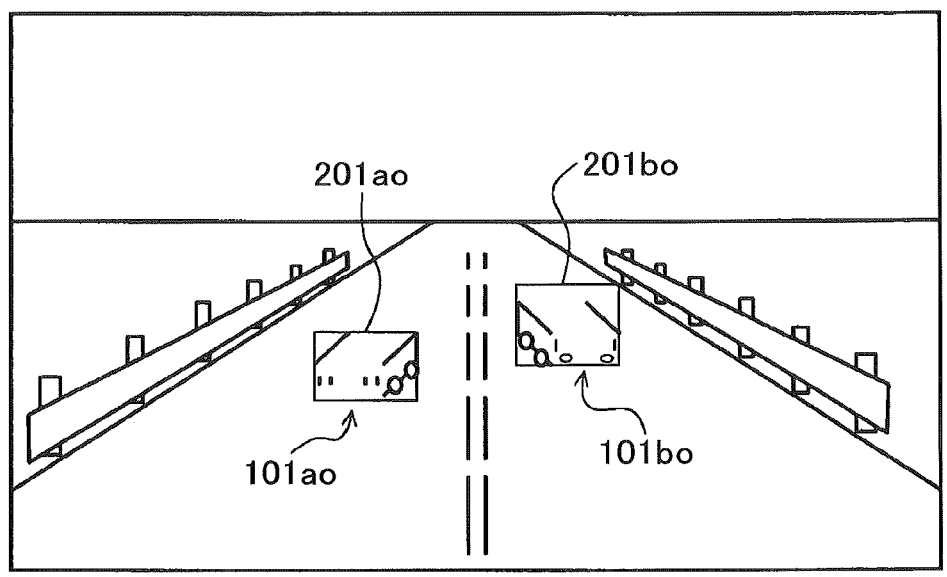
FIG. 9 is a schematic view illustrating an object area extraction process based on a detection result in FIGS. 8A-B.

FIG. 8A is a diagram illustrating a real frequency U map in which rectangular areas are set to have inscribed islands registered as object candidate areas; FIG. 8B is a diagram illustrating a parallax image having scanning ranges set corresponding to the rectangular areas in FIG. 8A; and FIG. 9 is a diagram illustrating a parallax image in which the scanning ranges in FIG. 8B have been searched to set object areas.

The object detector 33 detects a correspondence area of a parallax image corresponding to an island detected on a real U map, in order to obtain the correct position and height of the object. It is possible to determine a range (xmin, xmax) to be detected in the parallax image from the position, width, and minimum parallax of an island detected on the real U map.

Also, in the parallax image, it is possible to determine the height and position of the object. This height and position can be represented by a range from ymin="y coordinate corresponding to the maximum height from the road surface when the maximum parallax is dmax" to ymax="y representing the height of the road surface obtained from the maximum parallax dmax".

In order to detect the correct position of the object, the object detector 33 scans a set image area to extract a pixel that has a parallax value within a range of the depth of a rectangle detected as an island (the minimum parallax drain, the maximum parallax dmax) as a candidate pixel. Then, the object detector 33 sets a line having a predetermined ratio or greater with respect to the detected width in the horizontal direction among a group of extracted candidate pixels, as a candidate line. Areas where a candidate line exists are rectangles 201a and 201b surrounding the vehicles 101aru and 101bru as illustrated in FIG. 8A.

Next, the object detector 33 scans in the vertical direction, and in the case of detecting candidate lines with a predetermined density or greater around a line of interest, determines the line of interest as an object line.

Next, the object detector 33 searches in a search area of the parallax image for an object line, determines the lowermost end and the uppermost end of the object line, and determines circumscribed rectangles 201ao and 201bo of a group of object lines, as object areas 101ao and 101bo in the parallax image.

An object data list in which object information detected by the object detection device 30 in the embodiment is saved will be described with reference to Table 1 and Table 2.

TABLE 1

| OBJECT TYPE | WIDTH | HEIGHT | DEPTH |
|---|---|---|---|
| TWO WHEELER | <1100 | <2500 | >1000 |
| PEDESTRIAN | <1100 | <2500 | <=1000 |
| SMALL CAR | <1700 | <1700 | <10000 |
| STANDARD CAR | <1700 | <2500 | <10000 |
| TRUCK | <3500 | <3500 | <15000 |
| OTHERS | OTHER THAN THE ABOVE SIZES | | |

Table 1 is table data that specifies the size for each object type. Note that numerical values in Table 1 are merely an example. Here, the unit in Table 1 is mm. Here, if the width is less than 1100, the height is less than 2500, and the depth is greater than 1000, the object type is set as two-wheeler. Also, if the width is less than 1100, the height is less than 2500, and the depth is less than 1000, the object type is set as pedestrian. Also, if the width is less than 1700, the height is less than 1700, and the depth is less than 10000, the object type is set as small car.

Furthermore, if the width is less than 1700, the height is less than 2500, and the depth is less than 10000, the object type is set as standard car. Furthermore, if the width is less than 3500, the height is less than 3500, and the depth is less than 15000, the object type is set as truck. Note that an object out of any of such sizes is classified as others.

TABLE 2

| DATA NAME | DETAILS |
|---|---|
| POSITION | UPPER-LEFT COORDINATES IN IMAGE (x, y) |
| SIZE | OBJECT SIZE IN IMAGE (w, h) |
| DISTANCE | DISTANCE TO SUBJECT (m) |
| RELATIVE SPEED | RELATIVE SPEED PER FRAME (BREADTH X(m/frame), DEPTH Z(m/frame)) |
| MAXIMUM PARALLAX | MAXIMUM PARALLAX OF OBJECT |
| MINIMUM PARALLAX | MINIMUM PARALLAX OF OBJECT |

Table 2 illustrates position, size, distance, relative velocity, and parallax information saved as current information on object data, which is used in a process of device control described with FIG. 1. Here, the position is represented by upper left coordinates (x, y) in an image; the size is represented by the dimensions (w, h) of an object in the image; the distance is represented by a distance to a photographic subject; the relative velocity is represented by the relative velocity per frame, or X (m/frame) laterally and Z (m/frame) in the depth direction; the maximum parallax is represented by the maximum parallax of the object; and the minimum parallax is represented by the minimum parallax of the object.

An object type classification process will be described. The actual height Ho of an object to be identified (referred to as an "object", below) projected on an image area corresponding to an object area can be calculated by the following Expression [2] from the height (yomax−yomin) of the object area 101ao or 101bo determined by the object detector 33.

$$Ho = zo \times (yo\max - yo\min)/f \qquad \text{Expression [2]}$$

where "zo" represents the distance between the vehicle and the object corresponding to the object area calculated from the minimum parallax value d in the object area; and "f" represents a value obtained by converting the focal length of the camera into the same unit as the unit of (yomax−yomin).

Similarly, the actual width Wo of the object projected on the image area corresponding to the object area can be calculated by the following Expression [3] from the width (xomax−xomin) of the object area determined by the object detector 33.

$$Wo = zo \times (xo\ \text{max} - xo\ \text{min})/f \qquad \text{Expression [3]}$$

Also, the depth Do of the object projected on the image area corresponding to the object area can be calculated by the following Expression [4] from the maximum parallax value dmax and the minimum parallax value dmin in the isolated area corresponding to the object area. Note that in Expression [4], BF represents a product of the base length multiplied by the focal length of the stereo camera; and offset represents the parallax at infinity.

$$Do = BF \times \{1/(d\ \text{min} - \text{offset}) - 1/(d\ \text{max} - \text{offset})\} \qquad \text{Expression [4]}$$

From information on the height, width, and depth of each object corresponding to an object area that can be calculated in this way, the object detector 33 classifies the types of objects as in Table 1.

Furthermore, from the parallax information, the distance to an object and the distance from the image center of a parallax image to the center of an object area are known. Therefore, the object detector 33 can determine the three-dimensional position of the object.

Referring back to FIG. 3B, the merging part 331 included in the object detector 33 in the embodiment will be described. The merging part 331 is a merging means of merging a large U map corresponding to a first map, and a small U map corresponding to a second map.

The merging part 331 selects the large U map if the distance from the stereo camera 10 is within a first range. Alternatively, the merging part 331 selects the small U map if the distance from the stereo camera 10 is within a second range out of the first range. Here, the "first range" is a predetermined area where the distance from the stereo camera 10 to the object is short, for example, 5 m to 10 m. Also, the "second range" is a predetermined area where the distance from the stereo camera 10 to the object is long, for example, 100 m or longer. In other words, in the embodiment, the second range is the predetermined area that exists farther away from the stereo camera 10 than the first range.

<Process of Detecting a Distant Vehicle by Using Small U Map in Embodiment>

Figure 10A:
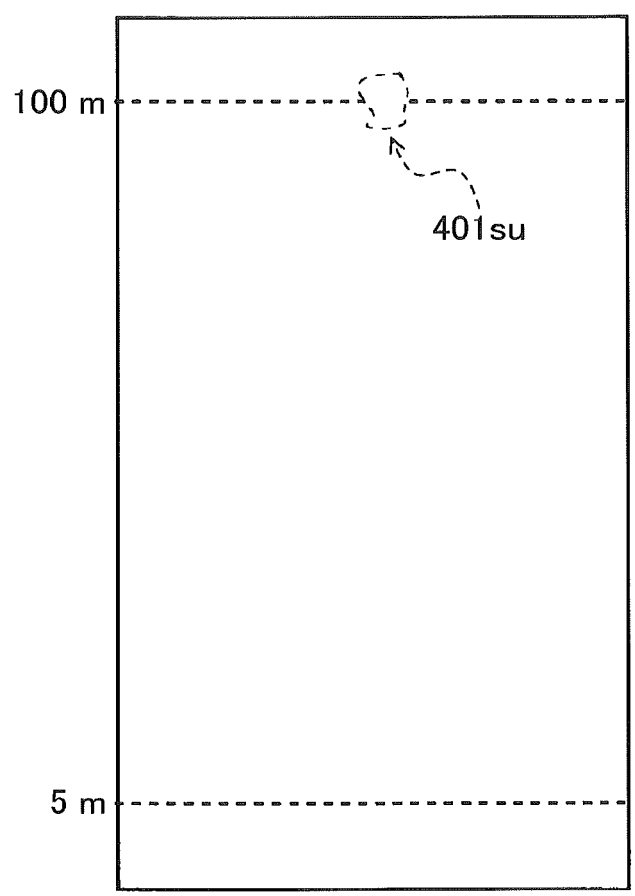
FIG. 10A is a schematic view illustrating a process of detecting a distant vehicle by using a small U map in an embodiment in the present disclosure.

A process of detecting a distant vehicle by using a small U map in the embodiment will be described with reference to FIGS. 10A-B. The small U-map generator 322 is a U map in which every other pixel in the horizontal direction is thinned out with respect to the large U map. In other words, the small U map is a map obtained by reducing the resolution of a large U map in the horizontal direction.

Figure 15A:
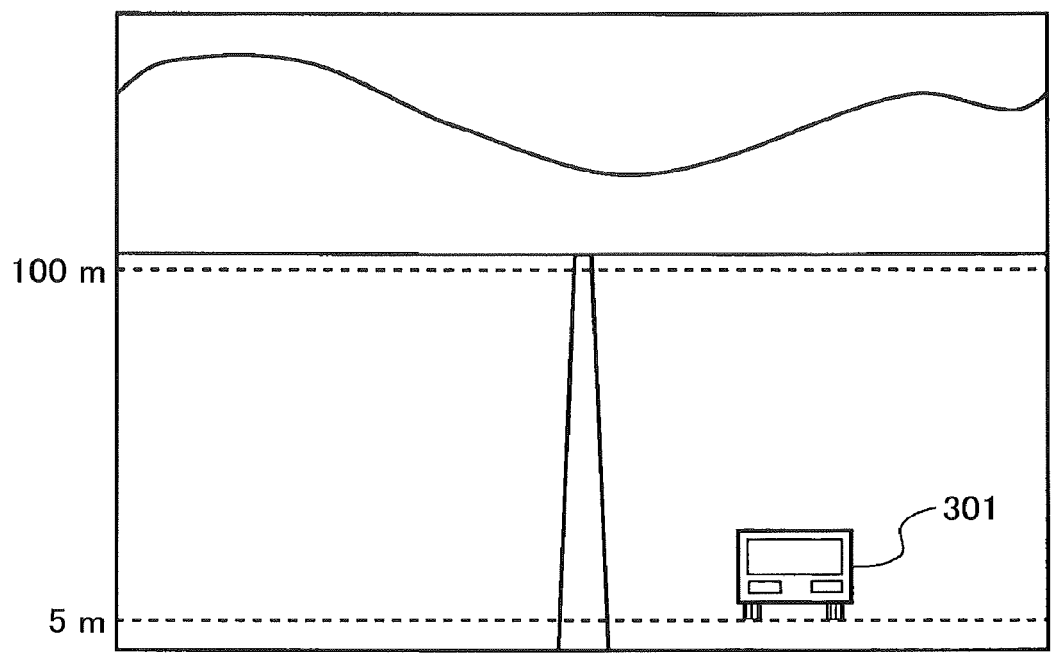
FIG. 15A is a schematic view for illustrating a conventional technology.
Figure 15B:
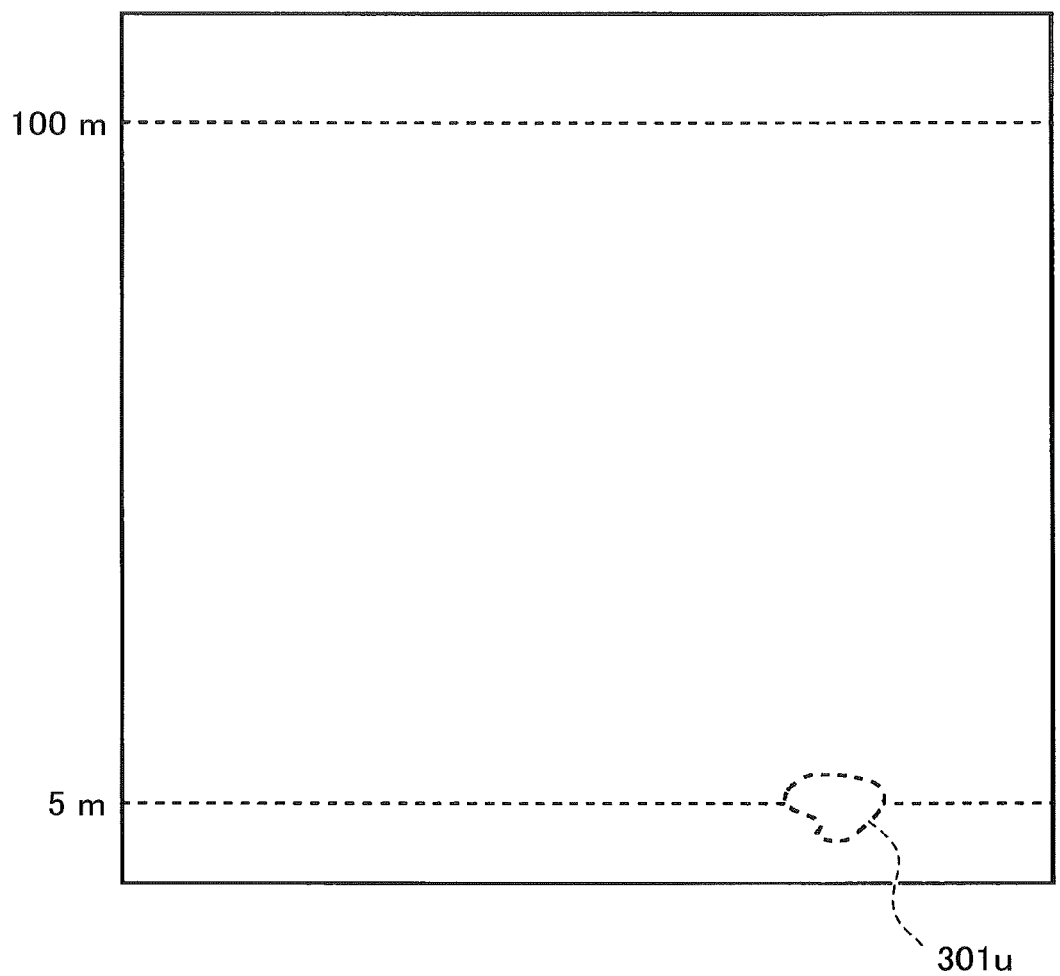
FIG. 15B is a schematic view for illustrating a conventional technology.
Figure 16A:
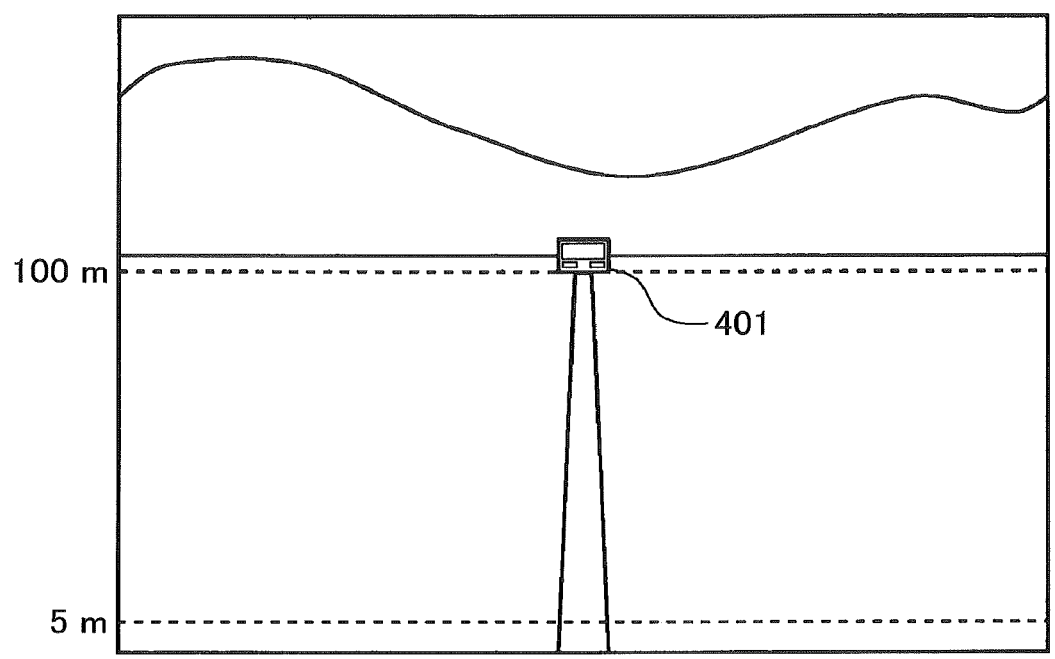
FIG. 16A is a schematic view for illustrating a conventional technology.
Figure 16B:
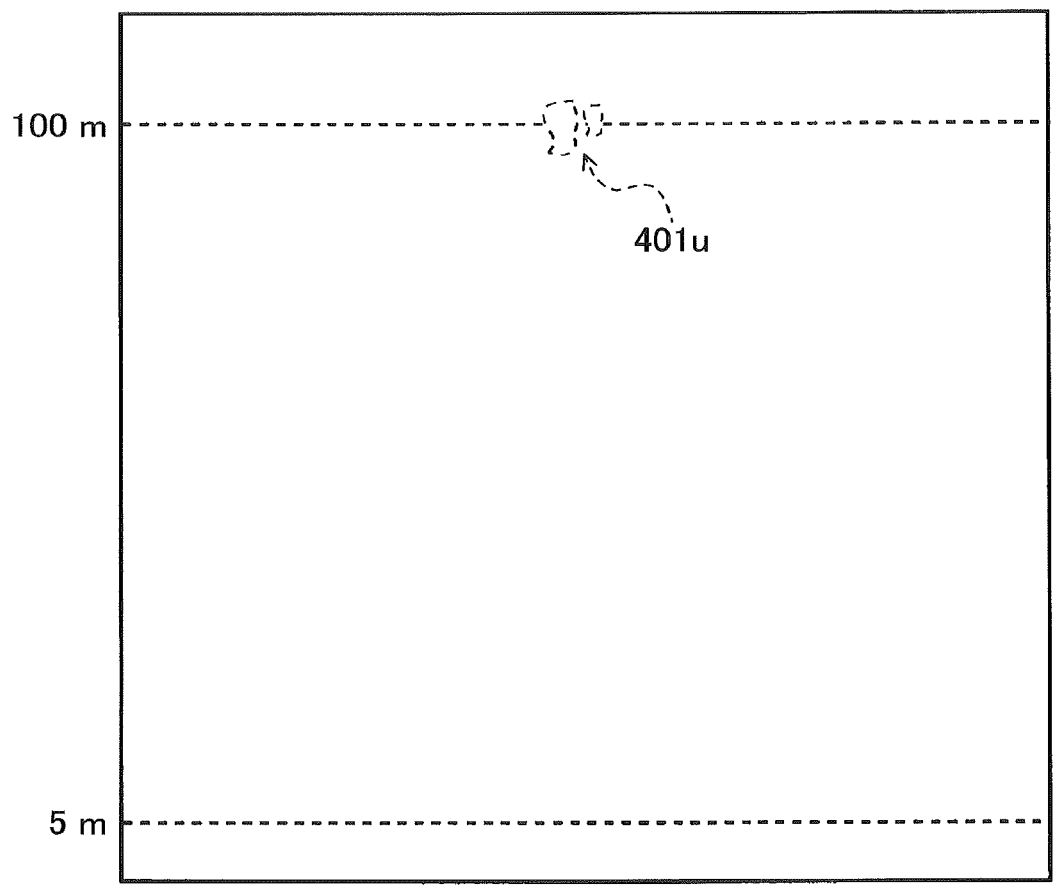
FIG. 16B is a schematic view for illustrating a conventional technology.

This enables, as illustrated in FIGS. 16A-B, to detect a vehicle 401 that exists 100 m away as a single mass 401su (A), which would be detected as two separate masses 401u by using the large U map conventionally (B). Note that as illustrated in FIGS. 15A-B, if it is the case of a vehicle 301 that exists closer at around 5 m away (A), detection is possible as a single mass 301u even in the case of using the large U map.

Note that although it is assumed in the following description that the resolution of a large U map is reduced only in the horizontal direction to obtain a small U map, not only in the horizontal direction, but also in the depth direction, the resolution may be reduced. This enables to realize the reduction of the memory capacity.

Figure 10B:
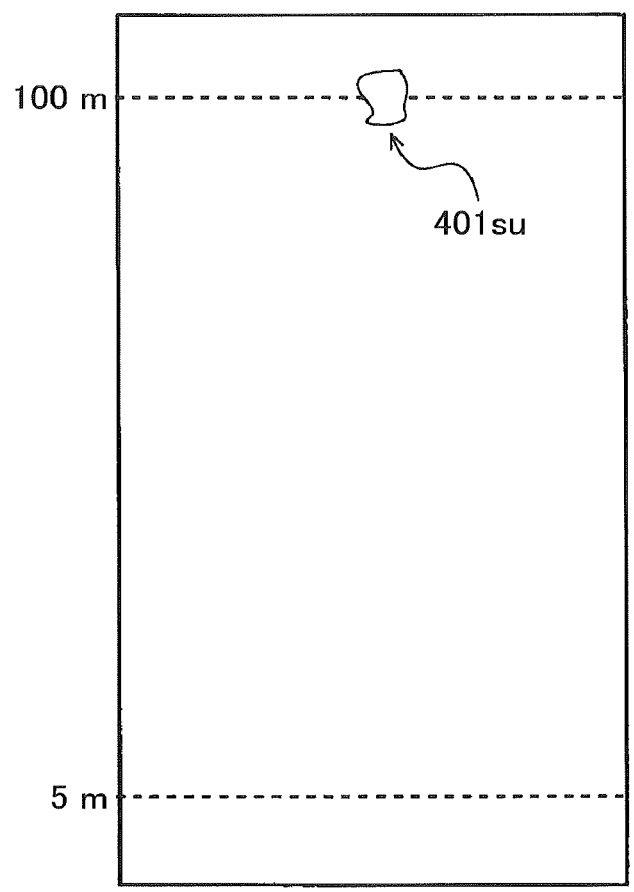
FIG. 10B is a schematic view illustrating a process of detecting a distant vehicle using a small U map in an embodiment in the present disclosure.

FIG. 10B illustrates a result of labeling on the mass 401su on a small U map generated by the small U-map generator 322.

<Clustering Result on Large U Map and Small U Map in Embodiment>

A clustering result on a large U map and a small U map in the embodiment will be described with reference to FIGS. 11A-B.

Figure 11A:
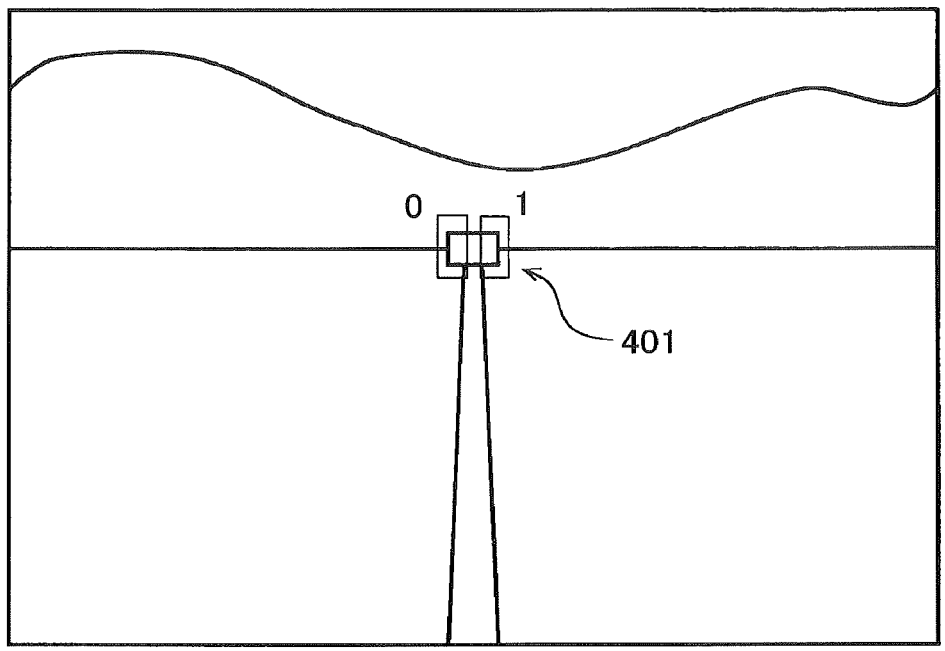
FIG. 11A is a schematic view illustrating a clustering result on a large U map and a small U map in an embodiment in the present disclosure.
Figure 11B:
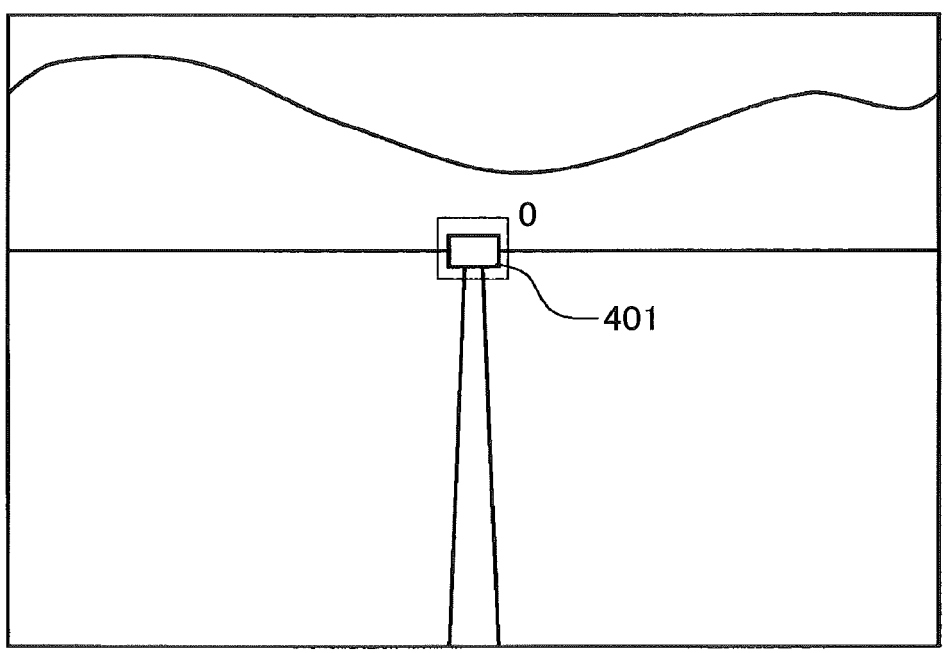
FIG. 11B is a schematic view illustrating a clustering result on a large U map and a small U map in an embodiment in the present disclosure.

As illustrated in FIG. 11A, it can be understood that in the case of clustering a distant vehicle on a large U map, it is detected as two masses of No. 0 and No. 1, and in the case of clustering the distant vehicle on a small U map, it is detected as a single mass of No. 0. In this way, in detection on a large U map, a higher resolution tends to bring a result in which a distant single object having less information is divided into two. On the other hand, in detection on a small U map, a lower resolution enables to stably detect a distant single object having less information without being divided apart.

<Detailed Steps of Object Detection Process in Embodiment>

Steps of a mass extraction process among steps of the object detection process in the embodiment will be described with reference to FIG. 12. First, the small U-map generator 322 generates a small U map, and the large U-map generator 323 generates a large U map (Step S11). In the embodiment, a small U map is generated simultaneously with or after generation of a large U map by thinning out the data in the width direction at every other pixel.

Next, the object detector 33 executes labeling on the small U map (Step S12), and extracts a candidate area of an object having the size of, for example, a vehicle, as a mass (Step S13). In the embodiment, since a small U map targets an extraction of a distant vehicle, a candidate area of an object having the size of a vehicle is extracted as a mass. In the embodiment, it is assumed that the size of a passenger car roughly corresponds to 6 pixels in width, and the size of a large-sized vehicle corresponds to 9 pixels in width.

Next, the object detector 33 executes labeling on the large U map (Step S14).

The merging part 331 merges labeling results obtained on the small U map and on the large U map, respectively (Step S15). The merging process will be described later.

Figure 12:
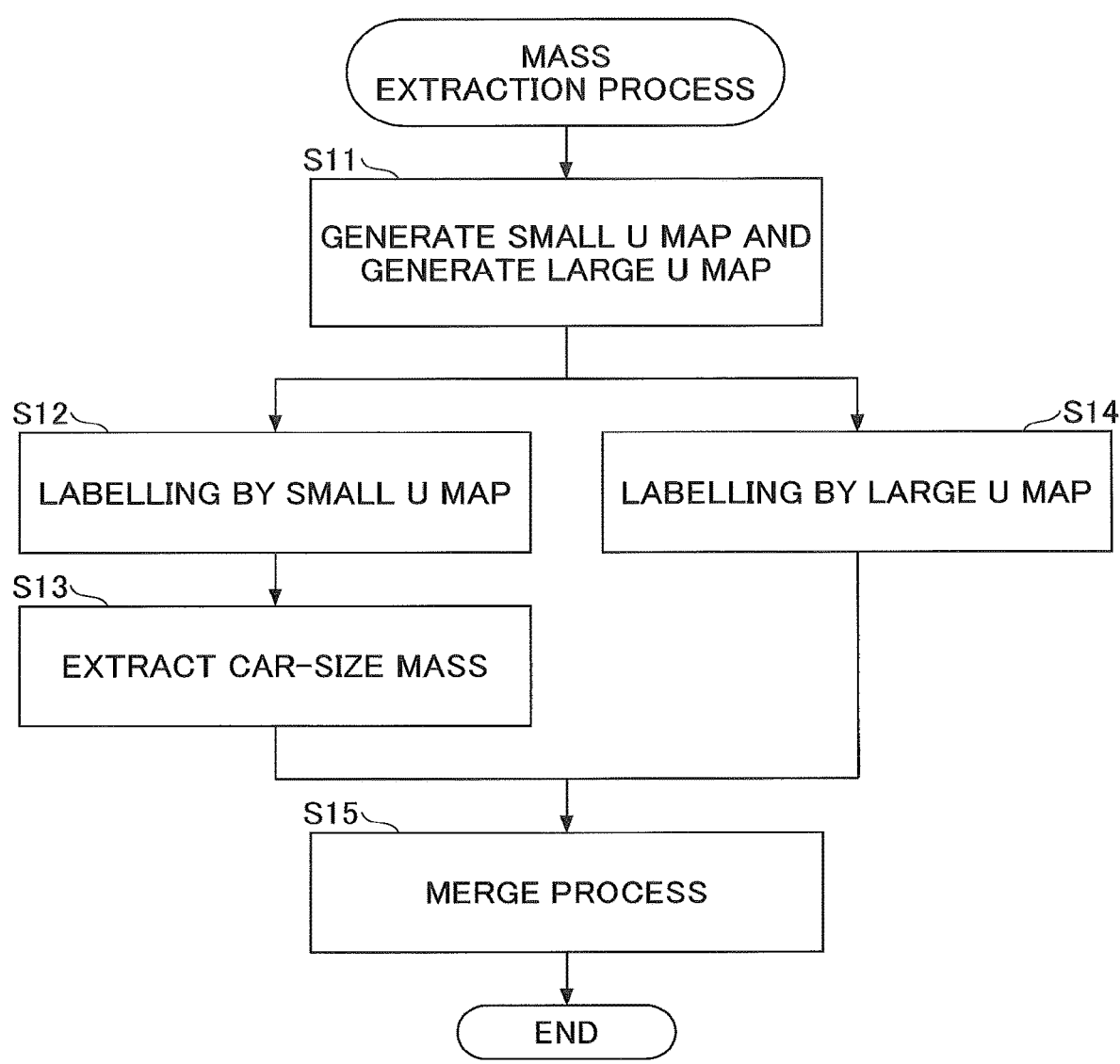
FIG. 12 is a flowchart illustrating detailed steps of an object detection process in an embodiment in the present disclosure.

<Steps of Merging Process in FIG. 12>

Figure 13:
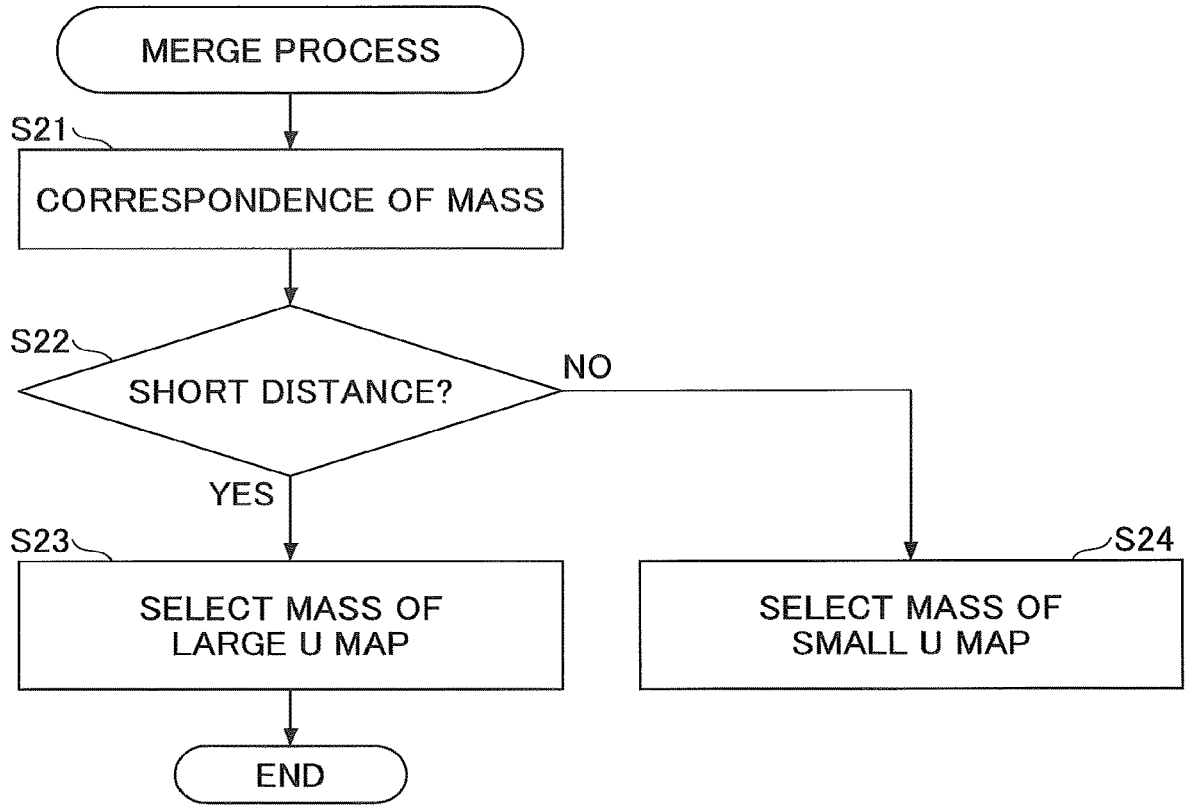
FIG. 13 is a flowchart illustrating steps of a merging process in FIG. 12.

Steps of a merging process in FIG. 12 will be described with reference to FIG. 13. The merging part 331 executes matching for each mass having a vehicle size extracted on the small U map and the large U map (Step S21). In the embodiment, matching is executed in the horizontal direction based on the distance.

The merging part 331 determines whether the distance is short from the stereo camera 10 to the mass as a candidate area (Step S22).

In the case of having determined that the distance is short from the stereo camera 10 to the mass as a candidate area (YES at Step S22), for the mass determined to have a short distance, the merging part 331 selects the mass on the large U map (Step S23).

On the other hand, in the case of having determined that the distance is not short from the stereo camera 10 to the mass as a candidate area (NO at Step S22), namely, for the mass determined to have a long distance, the merging part 331 selects the mass on the small U map (Step S24).

<Specific Example of Merging Process>

Figure 14A:
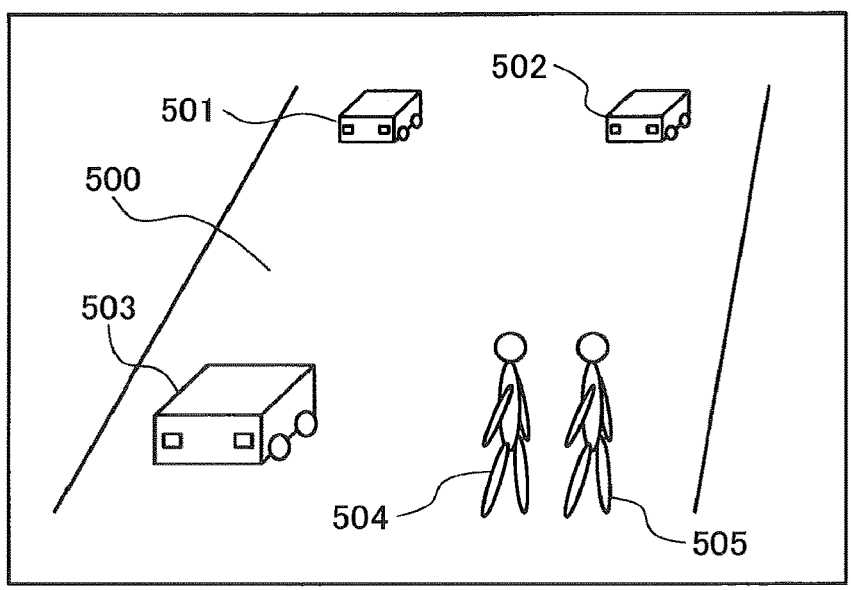
FIG. 14A is a schematic view illustrating a specific example of a merging process in FIG. 13.
Figure 14B:
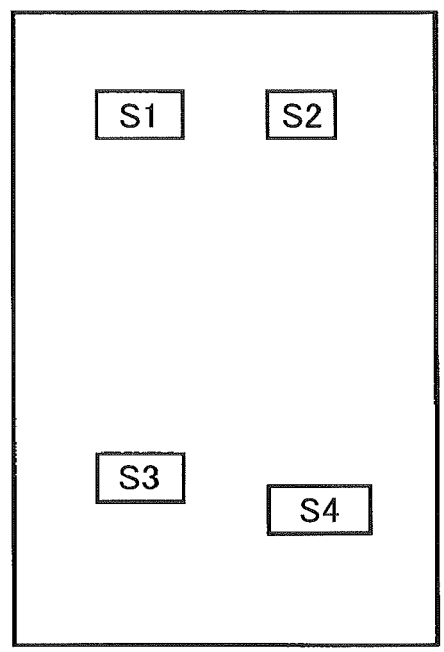
FIG. 14B is a schematic view illustrating a specific example of a merging process in FIG. 13.
Figure 14C:
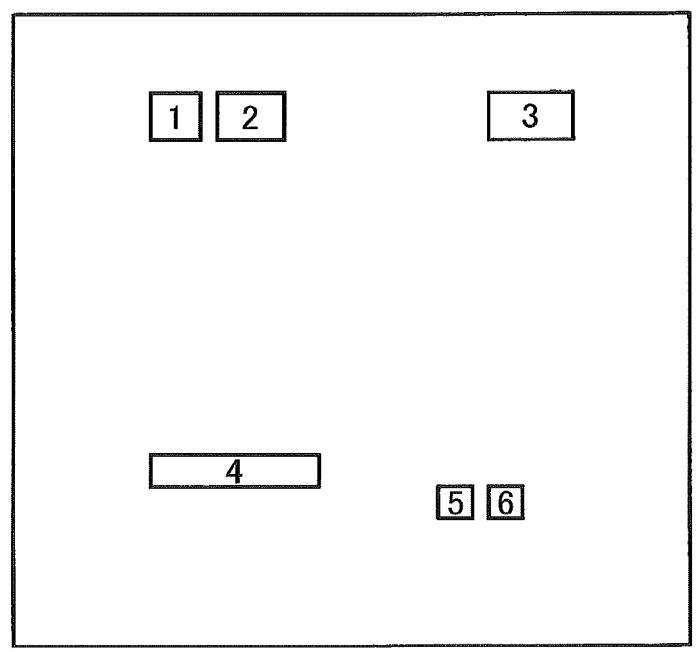
FIG. 14C is a schematic view illustrating a specific example of a merging process in FIG. 13.

The above merging process will be described with reference to FIGS. 14A-C illustrating a specific example. FIG. 14A is a captured image that captures a scene in which there exist a vehicle 501 and a vehicle 502 at a long distance from the stereo camera on a road surface 500, and a vehicle 503, a person 504, and a person 505 at a short distance from the stereo camera on the road surface 500.

FIG. 14B is a small U map generated from the captured image illustrated in FIG. 14A. Also, FIG. 14C is a large U map generated from the captured image illustrated in FIG. 14A. The merging part 331 makes a distinction between long and short on the basis of the distance from the stereo camera 10 to execute processing. In the embodiment, 5 m or shorter from the stereo cameras 10 is assumed to be short.

On the closer side of the small U map illustrated in FIG. 14B, masses of S3 and S4 exist, and around the same distance on the large U map illustrated in FIG. 14C, masses of [4], [5], and [6] exist. The merging part 331 executes matching between the mass of S4 and the masses of [5] and [6] in consideration of the sizes in the horizontal direction in the large U map. For example, a match may be identified in the case where <1> the difference between the center of S4, and the average of the center of [5] and the center of [6] is within a threshold, and <2> the difference between the size of S4, and the sum of the size of [5] and the size of [6] is within a threshold.

Similarly, for the distant masses, the mass of S1 is matched with the masses of [1] and [2] located around the same distance, and the mass of S2 is matched with the mass of [3].

The merging part 331 selects the mass in the large U map for a mass that exists at a short distance, and selects the mass in the small U map for a mass that exists at a long distance. Here, the merging part 331 selects the masses of [4], [5], and [6] in the large U map for the masses that exist at a short distance, and selects S1 and S2 in the small U map for the masses that exist at a long distance.

In other words, on a large U map having a higher resolution than a small U map, although it is possible to distinguish and detect multiple objects located at close positions from each other, a single object tends to be detected separately. On the other hand, although a single object does not tend to be separated and tends to be detected as a single object on a small U map, multiple objects tend to be detected as connected.

Thereupon, detection using a large U map is executed in a short distance where an object appears large on a captured image with a comparatively greater quantity of pixel information, whereas detection using a small U map is executed in a long distance where an object appears small on a captured image and tends to be separated due to a comparatively less quantity of pixel information. This enables to secure the continuity in the horizontal direction for a three-dimensional object at a long distance, and to stably detect a distance in the horizontal direction of an object, for example, the width of a vehicle.

As described above, according to the embodiment, even in the case where an object is recognized as multiple masses and cannot be recognized as a single object due to use of a U map having a comparatively high resolution that makes the distant parallax sparse, namely, makes the pixel density smaller, and makes the object recognized as multiple masses, by using together a small U map having a lower resolution, it is possible to prevent the parallax value of a distant object from becoming sparse or from having a lower density, and it is possible to detect an object desired to be detected as a mass having a certain size or greater. Consequently, when detecting an object such as a person or a preceding vehicle by using a parallax image by a stereo camera, it is possible to detect a distant object more stably than conventionally achieved.

Note that the embodiments described above are favorable embodiments in the present disclosure, and can be applied with various changes within a range not deviating from the subject matters in the present disclosure. For example, the processes in the image processing device in the embodiments described above may be implemented by hardware, software, or a composite configuration of both.

Note that in the case of implementing a process by using software, it is possible to implement by installing a program that records a process sequence into a memory in a computer built as dedicated hardware. Alternatively, the program may be installed on a general-purpose computer that can execute various processes.

Also, in the embodiments described above, although a method has been described that uses a small U map for a mass that exists in a long distance to prevent scatter of the parallax value so as to stably detect a distant mass more easily, the present invention is not limited as such. For example, the method may be realized such that pixels are thinned out at a stage of the object detection process.

Also, when detecting a mass on a parallax image, there may be a case where a distant object is not detected stably; in such a case, the method may generate two parallax images having different resolutions to stably detect a distant object.

Also, in the embodiment described above, although a stereo camera is described as a premise, it is not limited as such. For example, a distance image may be generated by combining distance information of a laser radar or the like and a parallax image, so as to apply an object detection device in the embodiment to the generated distance image.

What is claimed is:

1. An object detection device, comprising:
processing circuitry configured to
generate, based on a distance image that includes a distance for each pixel that is defined by a horizontal coordinate along a horizontal axis and a vertical coordinate along a vertical axis, a first map in which a first axis is the horizontal axis of the distance image and a second axis is the distance, and a second map in which the first axis is the horizontal axis of the distance image and the second axis is the distance, the second map having a lower resolution than the first map, and the first and second maps being different from the distance image; and
determine an object using information in the first map when a location of the object along the second axis is determined to be within a first distance range, and determine the object using information in the second map when the location of the object is determined to be within a second distance range different from the first distance range.

2. The object detection device as claimed in claim 1, wherein the processing circuitry is further configured to determine the object using the second distance range, which includes distances greater than those in the first distance range.

3. The object detection device as claimed in claim 1, wherein the processing circuitry is further configured to generate the second map by thinning out pixels in the horizontal direction of the first map.

4. The object detection device as claimed in claim 1, wherein the processing circuitry is further configured to merge a first detection result determined using the first map with a second detection result determined using the second map by selecting the first detection result when the location is within the first distance range, and selecting the second detection result when the location is within the second distance range.

5. The object detection device of claim 1, wherein the processing circuitry is further configured to detect a first candidate object using the first map, detect a second candidate object using the second map, the second candidate object corresponding to the first candidate object, and determine the object to be one of the first and second candidate objects, based on a location of the first and second candidate objects and the first and second distance ranges.

6. The object detection device of claim 1, wherein each particular pixel of the first map generated by the processing circuitry represents a frequency of a particular distance occurring at a particular horizontal position, the particular pixel of the first map being located at coordinates given by the particular horizontal position and the particular distance.

7. The object detection device of claim 1, wherein the processing circuitry is further configured to generate the distance image, which is a parallax image generated from brightness image data output from a stereo camera.

8. A device control system, comprising:
processing circuitry configured to
generate, based on a distance image that includes a distance for each pixel that is defined by a horizontal coordinate along a horizontal axis and a vertical coordinate along a vertical axis, a first map in which a first axis is the horizontal axis of the distance image and a second axis is the distance, and a second map in which the first axis is the horizontal axis of the distance image and the second axis is the distance, the second map having a lower resolution than the first map, and the first and second maps being different from the distance image;
determine an object using information in the first map when a location of the object along the second axis is determined to be within a first distance range, and determine the object using information in the second map when the location of the object is determined to be within a second distance range different from the first distance range; and
a controller configured to control a predetermined device based on the determined object.

9. An imaging device, comprising:
the object detection device as claimed in claim 1; and
two imaging units, outputs of which are used to generate the distance image.

10. A moving object comprising:
the device control system as claimed in claim 8,
wherein the moving object is controlled by the controller.

11. A non-transitory computer-readable recording medium having a program stored therein for causing a computer to execute a process, the process comprising:
generating, based on a distance image that includes a distance for each pixel that is defined by a horizontal coordinate along a horizontal axis and a vertical coordinate along a vertical axis, a first map in which a first axis is the horizontal axis of the distance image and a second axis is the distance, and a second map in which the first axis is the horizontal axis of the distance image and the second axis is the distance, the second map having a lower resolution than the first map, and the first and second maps being different from the distance image; and
determining an object using information in the first map when a location of the object along the second axis is determined to be within a first distance range, and determining the object using information in the second map when the location of the object is determined to be within a second distance range different from the first distance range.

* * * * *